US007153345B2

United States Patent
Li et al.

(10) Patent No.: US 7,153,345 B2
(45) Date of Patent: Dec. 26, 2006

(54) SULFUR OXIDE ADSORBENTS AND EMISSIONS CONTROL

(75) Inventors: Liyu Li, Richland, WA (US); David L. King, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 513 days.

(21) Appl. No.: 10/771,866

(22) Filed: Feb. 4, 2004

(65) Prior Publication Data

US 2005/0169826 A1    Aug. 4, 2005

(51) Int. Cl.
*B01D 53/50* (2006.01)
*B01D 53/56* (2006.01)
*B01D 53/94* (2006.01)

(52) U.S. Cl. .................. 95/137; 95/902; 96/117.5; 423/244.02; 423/244.06

(58) Field of Classification Search ............... 95/135, 95/137, 902; 96/117.5, 154; 423/244.01, 423/244.02, 244.06, 244.09, 244.1; 502/34, 502/38, 324; 422/168; 60/272, 273, 282, 60/299, 311
See application file for complete search history.

(56) References Cited

U.S. PATENT DOCUMENTS

| 5,340,562 A | 8/1994 | O'Young et al. |
| 5,545,393 A | 8/1996 | O'Young et al. |
| 5,578,282 A | 11/1996 | O'Young et al. |
| 5,597,944 A | 1/1997 | O'Young et al. |
| 5,635,155 A | 6/1997 | O'Young et al. |
| 5,695,618 A | 12/1997 | O'Young et al. |
| 5,702,674 A | 12/1997 | O'Young et al. |
| 5,772,898 A | 6/1998 | Lewis |
| 5,846,406 A | 12/1998 | Sudhakar et al. |
| 5,898,015 A | 4/1999 | Yokoi et al. |

(Continued)

FOREIGN PATENT DOCUMENTS

| CN | 1043113 A  *  6/1990 |
| DE | 10049119 A1    4/2002 |

(Continued)

OTHER PUBLICATIONS

Liyu, Li et al., "Cryptomelane as High Capacity Sulfur Dioxide Absorbent for Diesel Emission Control: A Stability Study," *Ind. Eng. Chem. Res.*, vol. 44, pp. 7388-7397 (2005).

(Continued)

*Primary Examiner*—Frank M. Lawrence
(74) *Attorney, Agent, or Firm*—Klarquist Sparkman, LLP

(57) ABSTRACT

High capacity sulfur oxide absorbents utilizing manganese-based octahedral molecular sieve (Mn—OMS) materials are disclosed. An emissions reduction system for a combustion exhaust includes a scrubber 24 containing these high capacity sulfur oxide absorbents located upstream from a NOX filter 26 or particulate trap.

38 Claims, 12 Drawing Sheets

U.S. PATENT DOCUMENTS

| | | |
|---|---|---|
| 6,001,319 A | 12/1999 | Yokoi et al. |
| 6,145,303 A | 11/2000 | Strehlau et al. |
| 6,156,283 A | 12/2000 | Allen et al. |
| 6,162,530 A | 12/2000 | Xiao et al. |
| 6,340,066 B1 | 1/2002 | Dettling et al. |
| 6,471,923 B1 | 10/2002 | Becue et al. |
| 6,503,476 B1 | 1/2003 | Suib et al. |
| 6,517,802 B1 | 2/2003 | Xiao et al. |
| 6,517,899 B1 | 2/2003 | Hoke et al. |
| 6,551,564 B1 | 4/2003 | Becue et al. |
| 6,579,507 B1 | 6/2003 | Pahlman et al. |
| 2001/0021363 A1* | 9/2001 | Poles et al. ............... 423/230 |
| 2003/0059356 A1* | 3/2003 | Hoke et al. ............... 423/210 |
| 2003/0091499 A1 | 5/2003 | Becue et al. |

FOREIGN PATENT DOCUMENTS

| | | |
|---|---|---|
| EP | 0710622 A1 | 5/1996 |
| EP | 1099467 | 5/2001 |
| KR | 2000031268 A * | 6/2000 |
| SU | 1375300 A * | 2/1988 |

OTHER PUBLICATIONS

Liyu, Li et al., "Synthesis and Characterization of Silver Hollandite and Its Application in Emission Control," *Chem. Mater.*, vol. 17, pp. 4335-4343 (2005).

* cited by examiner

SULFUR OXIDE ADSORBENTS AND EMISSIONS CONTROL

GOVERNMENT RIGHTS

This invention was made with Government support under Contract Number DE-AC06-76RLO1830 awarded by the U.S. Department of Energy. The Government has certain rights in the invention.

TECHNICAL FIELD

The present invention is generally related to pollution control, and more particularly, but not exclusively, is directed to high capacity sulfur oxide adsorbents and uses therefore in emissions control.

BACKGROUND

The combustion waste gases (i.e. the exhaust) of thermal power plants, factories, on-road vehicles, diesel generators, and the like contain $SO_x$ and $NO_x$. State and federal regulations limit the permissible amounts of these emissions because they create environment problems, such as acid rain. Accordingly, there is a continual need for improvements in the cost effective and efficient control of these emissions.

One mechanism for limiting $NO_x$ and $SO_x$ emissions is to remove or scrub the pollutants from the exhaust gas using an absorption bed, trap or similar device. Because many $NO_x$ traps have been found to be poisoned by the presence of $SO_x$, it is important to remove as much $SO_x$ from the exhaust gas as possible. However, as compared to the large volume of studies on $NO_x$ reduction, sulfur oxide removal using solid adsorbents is an area in need of scientific advancement. For example, certain types of materials have been identified as possible solid absorbents for use in a $SO_x$ adsorption bed or traps, for example calcium oxide and alkalized alumina ($Na/Al_2O_3$ or $K/Al_2O_3$), copper-based adsorbents, e.g. $Cu/Al_2O_3$, promoted metal oxides, e.g. $TiO_2$, $Al_2O_3$, $ZrO_2$, promoted cerium oxide (La- or Cu-doped $CeO_2$), and supported cobalt ($Co/Al_2O_3$). Unfortunately, over the temperature range of about 250° C. to 475° C., these materials typically have a relatively low absorption capacity. For example, their total adsorption capacity of $SO_2$ is typically less than about 10 wt % based on the weight of the absorbent, and their breakthrough absorption capacity can be substantially lower, depending on operating conditions. As it is combustion in this temperature range that leads to a significant portion of the total $SO_x$ emissions, a greater adsorption capacity at these temperatures is needed.

One approach to increasing the absorption capacity of $SO_x$ absorption beds is to provide an oxidation catalyst upstream or admixed with the bed so as to convert most of the $SO_2$ to $SO_3$, since $SO_3$ is generally more readily adsorbed than $SO_2$ due to its formation of stable surface sulfates. However, the cost of recovery of the oxidation catalyst (frequency a precious metal) and the relatively poor conversion efficiency of $SO_2$ to $SO_3$ at temperatures below about 300° C. limits the effectiveness of this approach as well.

Accordingly, there is a need for solid $SO_x$ absorbents with high absorption capacity at lower temperatures and which reduce or eliminate the need for separate oxidation catalysts. In one aspect the present invention addresses this need and provides a major improvement to $SO_x$ absorption for emissions control.

SUMMARY

The present invention provides systems and techniques for $SO_x$ emission control. While the actual nature of the invention covered herein can only be determined with reference to the claims appended hereto, certain aspects of the invention that are characteristic of the embodiments disclosed herein are described briefly as follows.

In one form, the invention concerns materials for absorbing, trapping, or otherwise eliminating oxides of sulfur from gases, for example those sulfur oxides present in exhaust gases of internal combustion engines. The materials are mixed oxides having a framework of metal cations M each surrounded by 6 oxygen atoms wherein the octahedra ($MO_6$) thus formed are connected together by edges and vertices generating a structure that produces channels in at least one direction in space. The sides of these channels are formed by linking the octahedra ($MO_6$), which connect together by the edges, these sides connecting themselves together via the vertices of the octahedra. Thus, the width of the channels can vary depending on whether the sides are composed of 2, 3 and/or 4 octahedra ($MO_6$), which in turn depends on the mode of preparation. This type of material is known by its acronym OMS, Octahedral Molecular Sieve. In accordance with one form of the invention, the materials are selected so that they have a structure that generates channels either with a square cross section composed of, for example, one octahedra by one octahedra (OMS 1×1), two octahedra by two octahedra (OMS 2×2) or three octahedra by three octahedra (OMS 3×3), or with a rectangular cross section composed of, for example, two octahedra by three octahedra (OMS 2×3). Thus, certain of the materials will have a pyrolusite (OMS 1×1), hollandite (OMS 2×2), romanechite (OMS 2×3) or todorokite (OMS 3×3) type structure. Other OMS structures, such as 1×3, 1×4 or 2×4, 3×4 or 4×4, are also contemplated, though the 2×2 structure has been found to be particularly effective in certain applications.

The OMS materials of the present invention are preferably manganese based (Mn—OMS), which means that a major portion of the metal cation M is manganese (Mn). An element is in the majority when it satisfies the following formula: $(n_{maj}/\Sigma n_M) > 1/N$, where $n_M$ is the number of atoms of element (M) and N is the number of different elements (M) composing the framework, $n_{maj}$ being the highest number of atoms of element (M). Most preferably, over 50% of the elements M are manganese for example at least 75% or at least 90% of the element M by mole. Preferably the manganese has an oxidation number between +2 and +4. The balance of element M can include one or more elements from groups IIIB to IIIA in the periodic table such as $Zn^{2+}$, $Co^{2+}$, $Ni^{2+}$, $Fe^{2+}$, $Al^{3+}$, $Ga^{3+}$, $Fe^{3+}$, $Ti^{3+}$, $In^{3+}$, $Cr^{3+}$, $Si^{3+}$, $Ge^{4+}$, $Ti^{4+}$, $Sn^{4+}$, and $Sb^{5+}$ and combinations thereof. The material used in this invention has a characteristic structure of high surface area and may be capable of oxidizing $SO_2$ to $SO_3$ and converting $SO_3$ to a sulfate. In certain cases, but not all cases, another cation, such as $H^+$, $NH_4^+$, $Li^+$, $Na^+$, $Ag^+$, $K^+$, $Rb^+$, $Tl^+$, $Cs^+$, $Mg^{2+}$, $Ca^{2+}$, $Sr^{2+}$, $Ba^{2+}$, $Ra^{2+}$, $Cu^{2+}$, $Pb^{2+}$, locates in the channels in the OMS structures.

The absorbing phase of materials with type OMS 2*2, OMS 2*3 and OMS 3*3 of one aspect of the invention has a three-dimensional structure that generates channels in at least one direction in space, is composed of octahedra ($MO_6$) and comprises:

at least one element (M) selected from the group formed by elements from groups IIIB, IVB, VB, VIB, VIIB, VIII, IB, IIB, IIIA of the periodic table and germanium, each element M being coordinated with 6 oxygen atoms, and located at the center of the oxygen octahedra, wherein a major portion of M is manganese; and at least one element (B) selected from the group formed by the alkali elements IA, the alkaline-earth elements IIA, the rare earths IIIB, transition metals or elements from groups IIIA and IVA, element B generally being located in channels in the oxide structure.

More particularly, elements M are selected from scandium, titanium, zirconium, vanadium, niobium, chromium, molybdenum, tungsten, manganese, iron, cobalt, nickel, copper, zinc, aluminum, gallium, and mixtures thereof.

The average charge (oxidation number) carried by the cation or cations M from groups IIIB to IIIA is preferably about +3.5 to +4. Preferably, at least about 50% of the elements (M) in the material are manganese, titanium, chromium, aluminum, zinc, copper, zirconium, iron, cobalt, and/or nickel. More preferably, over 50% of the elements (M) are manganese, chromium, copper, iron, titanium and/or zirconium. In one form, manganese composes at least about 50% of the M element by mole, for example at least 75% or 90% of the M element.

Other elements M from groups IIIB to IIIA can be added in minor quantities as dopants. Preferably, the elements from groups IIIB to IIIA added in minor quantities are selected from scandium, titanium, zirconium, vanadium, niobium, chromium, molybdenum, tungsten, manganese, iron, cobalt, nickel, copper, zinc, aluminum, gallium, and mixtures thereof.

Elements (B) belong to the group formed by the alkali elements IA, alkaline-earth elements IIA, rare earth elements IIIB, transition metals and elements from groups IIIA and IVA. They are located in the channels of the material. Preferably, metal B is selected from the group formed by potassium, sodium, magnesium, barium, strontium, iron, copper, zinc, aluminum, rubidium and calcium and mixtures thereof.

A number of different methods exist for preparing these materials (see references 3 and 4 below, for example). They may be synthesized by mixing and grinding solid inorganic precursors of metal oxides (metals M and B), followed by calcining. The materials can also be obtained by heating solutions of precursor salts to reflux, drying and calcining, by precipitating precursor salts by the sol-gel method, or by hydrothermal synthesis which consists of heating an aqueous solution containing the elements constituting the final material under autogenous pressure. The materials obtained from these syntheses can be modified by ion exchange or isomorphous substitution.

Optional metal (C) is introduced using any of the methods known to the skilled person: excess impregnation, dry impregnation, ion exchange, etc.

The material of the invention generally has a specific surface area in the range 1 to 300 $m^2/g$, preferably in the range 2 to 300 $m^2/g$, and more preferably in the range 30 to 250 $m^2/g$. The adsorption kinetics are better when the specific surface area is high, i.e., in the range 10 $m^2/g$ such as in the range 30 to 250 $m^2/g$.

The sorbent phase can be in the form of a powder, beads, pellets or extrudates; they can also be deposited or directly prepared on monolithic supports of ceramic or metal. To increase the dispersion of the materials and thus to increase their absorption capacity, the materials can be deposited on porous supports with a high specific surface area before being formed (extrusion, coating . . . ). These supports are generally selected from the group formed by the following compounds: alumina (alpha, beta, delta, gamma, khi, or theta alumina), silicas ($SiO_2$), silica-aluminas, zeolites, titanium oxide ($TiO_2$), zirconium oxide ($ZrO_2$), magnesium oxide (MgO), divided carbides, for example silicon carbides (SiC), used alone or as a mixture. Mixed oxides or solid solutions comprising at least two of the above oxides can be added.

For many uses, such as in connection with a vehicle exhaust, it is usually preferable to use rigid supports (monoliths) with a large open porosity (more than 70%) to limit pressure drops that may cause high gas flow rates, and in particular high exhaust gas space velocities. These pressure drops are deleterious to proper functioning of the engine and contribute to reducing the efficiency of an internal combustion engine (gasoline or diesel). Further, the exhaust system is subjected to vibrations and to substantial mechanical and thermal shocks, so catalysts in the form of beads, pellets or extrudates run the risk of deterioration due to wear or fracturing.

Two techniques are used to prepare the catalysts of the invention on monolithic ceramic or metal supports (or substrates).

The first technique comprises direct deposition on the monolithic support, using a wash coating technique which is known to the skilled person, to coat the adsorbing phase prepared using the operating procedure described, for example, in reference (4) below. (S. L. Suib, C-L O'Young, "Synthesis of Porous Materials", M. L. Occelli, H. Kessler, eds, M. Dekker, Inc., p. 215, 1997). The adsorbent phase can be coated just after the co-precipitation step, hydrothermal synthesis step or heating under reflux step, the final calcining step being carried out on the phase deposited on the monolith, or the monolith can be coated after the material has been prepared in its final state, i.e., after the final calcining step.

The second technique comprises depositing the inorganic oxide on the monolithic support and then calcining the monolith between 500° C. and 1100° C. so that the specific surface area of this oxide is in the range 20 to 150 $m^2/g$, then coating the monolithic substrate covered with the inorganic oxide with the adsorbent phase obtained after the steps described in the reference (4).

Monolithic supports that can be used include: ceramics, where the principal elements can be alumina, zirconia, cordierite, mullite, silica, alumino-silicates or a combination of several of these compounds; a silicon carbide and/or nitride; an aluminium titanate; and/or a metal, generally obtained from iron, chromium or aluminium alloys optionally doped with nickel, cobalt, cerium or yttrium.

The structure of a ceramic supports can be that of a honeycomb, or they are in the form of a foam or fibers.

Metal supports can be produced by winding corrugated strips or by stacking corrugated sheets to constitute a honeycomb structure with straight or zigzag channels which may or may not communicate with each other. They can also be produced from metal fibers or wires which are interlocked, woven or braided.

With supports of metal comprising aluminum in their composition, it is recommended that they are pre-treated at high temperature (for example between 700° C. and 1100° C.) to develop a micro-layer of refractory alumina on the surface. This superficial micro-layer, with a porosity and specific surface area which is higher than that of the original metal, encourages adhesion of the active phase and protects the remainder of the support against corrosion.

The quantity of sorbent phase deposited or prepared directly on a ceramic or metallic support (or substrate) is generally in the range 20 to 300 g per liter of said support, advantageously in the range 50 to 200 g per liter.

The materials of the invention can thus adsorb oxides of sulfur present in the gases, in particular exhaust gases. These materials are capable of adsorbing $SO_x$ at a temperature which is generally in the range 50° C. to 650° C., preferably in the range 100° C. to 600° C., more preferably in the range 150° C. to 550° C.

For diesel engines in automobiles, an intended application, the temperature of the exhaust gas may be in the range 150° C. to 500° C. and rarely exceeds 600° C. The materials used in the process of the invention are thus suitable for sorbing oxides of sulfur present in the exhaust gases of stationary engines or, particularly, automotive diesel engines or spark ignition (lean burn) engines, but also in the gases from gas turbines operating with gas or liquid fuels. These exhaust gases typically contain oxides of sulfur in the range of a few tens to a few thousands of parts per million (ppm) and can contain comparable amounts of reducing compounds (CO, $H_2$, hydrocarbons) and nitrogen oxides. These exhaust gases might also contain larger quantities of oxygen (1% to close to 20% by volume) and steam, though the present sorbents can be effective in oxygen free environments as well. The sorbent material of the invention can be used with HSVs (hourly space velocity, corresponding to the ratio of the volume of the monolith to the gas flow rate) for the exhaust gas generally in the range 500 to 150,000 $h^{-1}$, for example in the range 5,000 to 100,000 $h^{-1}$.

In has been found that absorption of $SO_x$ leads to a noticeable color change in the sorbent. Accordingly, in one variation, a $SO_x$ trap is provided by a quantity of the sorbent contained in a housing having a window. The color of the sorbent material is periodically monitored through the window with the need to replace or recharge the trap indicated by the color change. In this or other refinements, a spent $SO_x$ trap can be regenerated by appropriate reflux synthesis so as to reuse the sorbent support and the housing.

The $SO_x$ sorbent material of the present invention can be used anywhere $SO_x$ needs to be absorbed. In has been found that significant advantages can be realized in the overall control of emissions from a combustion exhaust by locating the $SO_x$ sorbent material upstream from a particulate filter or $NO_x$ trap.

According to another aspect of the invention, $SO_x$ adsorption is provided by a manganese oxide material which has inherent oxidizing capability, so that $SO_2$ can be oxidized and absorbed without use of a separate and costly oxidation catalyst, and which has a high total absorption capacity, for example greater than about 40% by weight, thereby providing economical and efficient emissions control.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part thereof.

DESCRIPTION OF THE ILLUSTRATED EMBODIMENT

Figure 1:
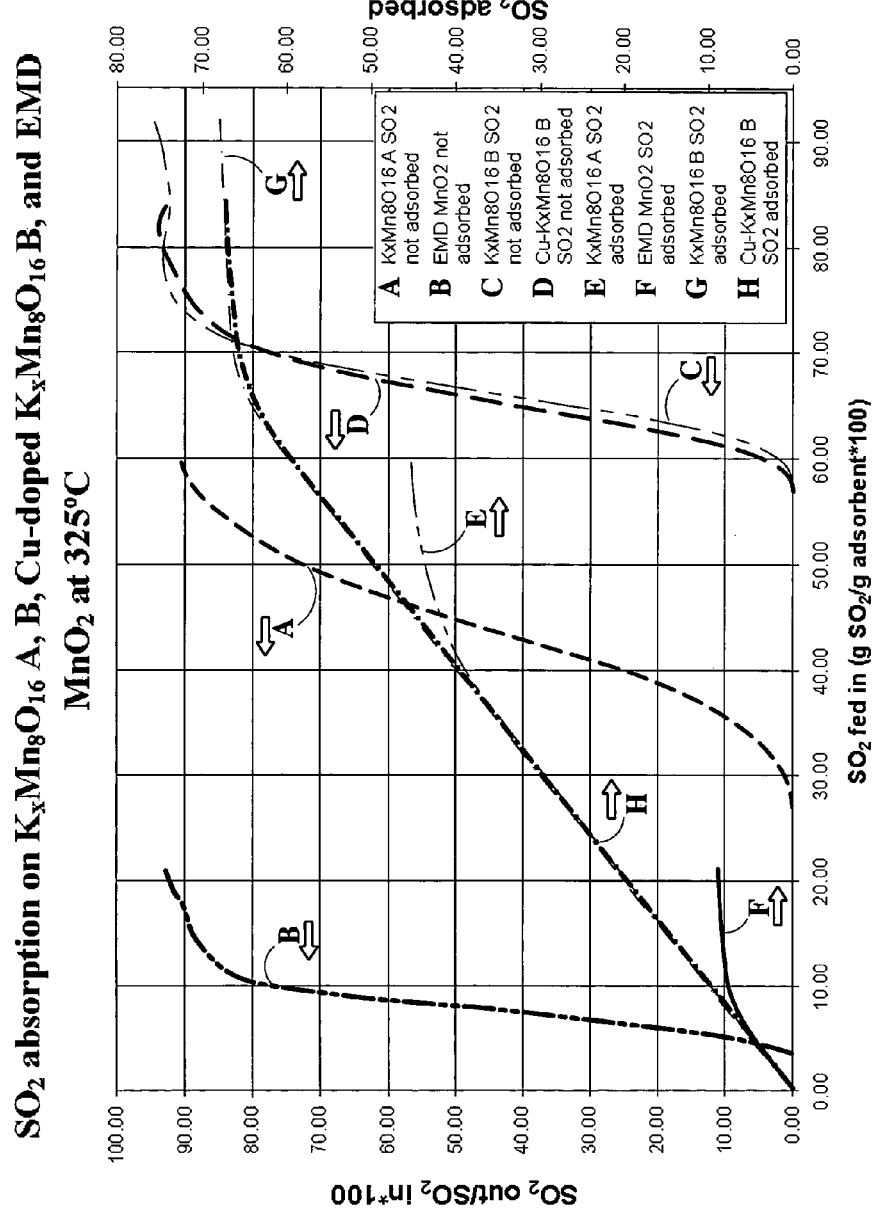
FIG. 1 is exemplary plots of the absorption of $SO_2$ on 2×2 Mn—OMS materials and on $MnO_2$.

For the purposes of promoting an understanding of the principles of the invention, reference will now be made to the embodiments illustrated in the drawings and specific language will be used to describe the same. It will nevertheless be understood that no limitation of the scope of the invention is hereby intended. Alterations and further modifications in the illustrated devices, and such further applications of the principles of the invention as illustrated herein are contemplated as would normally occur to one skilled in the art to which the invention relates.

In one form, the present invention employs a manganese based octahedral molecular sieve as a high capacity sulfur oxide solid absorbent. As compared to other adsorbents studied for the removal of $SO_2$ from waste gases, this material provides surprising high capacity and efficiency. In a preferred form, this material is referred to as Mn—OMS 2×2.

The basic structure of the materials employed in the Examples that follow consists of $MnO_6$ octahedra joined at edges to form a 2×2 hollandite tunnel structure with a pore size of about 0.46 nm. (1) For cryptomelane, a countercation, $K^+$, is present within the tunnel structure for charge compensation. Mn can assume an oxidation state of 4+, 3+, or 2+, and the average Mn oxidation state can be controlled within a certain range during synthesis. Generally, this material has a high surface area (~80 $m^2/g$), and high redox reaction activity. (2)

Without intending to be bound by any theory of operation, the present invention is based on carrying out the following reaction:

$$SO_2+K_xMn_8O_{16} \rightarrow MnSO_4+K_2O \qquad (1)$$

$SO_2$ is oxidized to $SO_3$ by $Mn^{4+}$ and $Mn^{3+}$, and $Mn^{4+}$ and $Mn^{3+}$ are simultaneously reduced to $Mn^{2+}$ (MnO). The $SO_3$ produced then reacts with $Mn^{2+}$ to form $MnSO_4$.

As explained herein, tunnel structure cryptomelane was found to be a high capacity sulfur dioxide adsorbent. Its $SO_2$ capacity from 250° C. to 475° C. is more than ten times higher than that of conventional $SO_2$ adsorbents. Its maximum $SO_2$ capacity can be as high as about 74 wt %. The dominant mechanism for $SO_2$ absorption is believed to be that $SO_2$ is oxidized by $Mn^{4+}$ and $Mn^{3+}$ to $SO_3$, with the $SO_3$ reacting with the co-produced $Mn^{2+}$ to form $MnSO_4$. It has been found that this reaction is primarily controlled by the mass diffusion of $SO_2$ through the adsorbent, and that it can surprisingly effectively occur in an oxygen-free environment. In addition, the visibly significant color change of cryptomelane from black to yellow after $SO_2$ absorption can be used as a convenient indicator for the adsorbent replacement.

Cryptomelane for $SO_2$ absorption can be synthesized either from a mixture of $KMnO_4$ and $MnSO_4$ or a mixture of $MnSO_4$ and KOH solution. After $SO_2$ absorption, $MnSO_4$ is formed, which can subsequently be dissolved in water and used as raw material for a subsequent cryptomelane synthesis. To regenerate the $SO_2$ absorption trap, therefore, only KOH and $O_2$ is needed because the adsorbent support (such as a monolith) and the $MnSO_4$ can be re-used.

This highly efficient $SO_2$ adsorbent can be used for removal of $SO_2$ generated from thermal power plants, factories, and on-road vehicles. It can be especially effective for removal of $SO_x$ that is present in the emissions of diesel trucks, in order to protect downstream emissions control devices such as particulate filters and NOx traps that are poisoned by $SO_x$.

Figure 10:
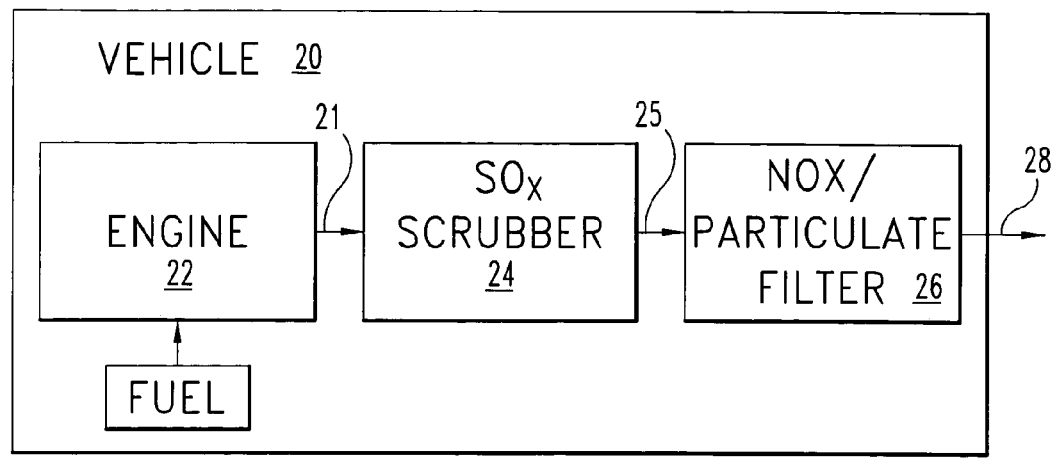
FIG. 10 is a schematic illustration of an emissions control system implemented on a vehicle producing combustion exhaust according to an embodiment of the invention.

Turning now to FIG. 10, a vehicle 20 implementing a simplified emissions control system according to the present invention is depicted. Vehicle 20 has an engine 22 fluidly connected to upstream and a downstream emissions control devices 24 and 26 respectively. Devices 24 and 26 perform different emissions control functions, and while they could be combined into a single device, as described more fully below, certain problems are avoided by the provision of separate devices.

The exhaust 21 from the engine 22 is first fed to the upstream device 24. The transfer of the exhaust, and all other fluid transfer operation can be in any conventional fashion, such as the exhaust piping of a conventional automobile, and may include intermediate fluid processing operations, such as catalytic conversion, mixing with other gases, or recycling of exhaust to the engine.

The upstream device 24 is a $SO_x$ scrubber, whose function is to remove any sulfur oxides from the exhaust gas 21 and to prevent their passage via channel 25 to the downstream device 26 and eventually the exhaust 28 to the atmosphere. The $SO_x$ scrubber functions to remove most if not all of any sulfur oxides in the gaseous exhaust 21. The $SO_x$ scrubber contains a solid $SO_x$ sorbent as described herein, preferably one supported on a monolith or similar support. The sorbent removes the $SO_x$ from the passing gas stream, for example by permanent or reversible sorption (adsorption or absorption) trapping, filtering, or chemical reaction therewith, and thereby prevents $SO_x$ from entering the downstream device 26.

The downstream device 26 provides a different emissions control function than the upstream device 24. As illustrated, the downstream device is a $NO_x$ scrubber or particulate filter and any conventional scrubber or filter can be employed. As many conventional $NO_x$ traps and/or particulate filters are fouled or poised by the presence of $SO_x$, the provision of upstream device 24 inventively reduces or eliminates this possibility by providing an inlet stream to device 26 that is substantially $SO_x$ free. For example, it is contemplated that device 24 will function to cause fluid at 25 to have less than 1% of the $SO_x$ concentration in the exhaust 21, more preferably less than about 0.1%.

Figure 11:
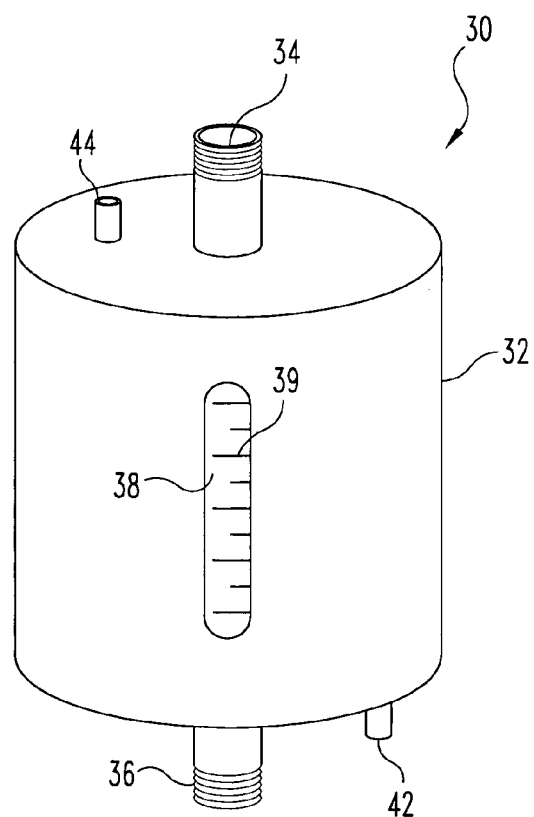
FIG. 11 is a perspective view of a $SO_x$ filter having a monitoring window and regeneration ports according to an embodiment of the invention.

Turning now to FIG. 11, an exemplary $SO_x$ scrubber 30, which can be employed for device 24 in the FIG. 10 system, is depicted. Scrubber 30 includes a housing 32 having a fluid inlet 34, a fluid outlet 36 and a fluid flow path therebetween. The housing contains a $SO_x$ sorbent in the flow path so as to facilitate the removal of $SO_x$ from the fluid as it passes through the $SO_x$ scrubber. Housing 32 also contains a window 38 providing visual access to the sorbent contained therein. As the sorbent contained in the housing 32 absorbs the $SO_x$, it will undergo a noticeable color change, with the sorbent nearer the inlet 34 becoming saturated (and thus changing color) sooner than the sorbent near the outlet 36. The resulting transition between different colored portions of the sorbent provides an indication on the extent that the sorbent packing has becoming spent. Accordingly, a series of indicator marks 39 are provided on the window 38 or on the housing 32 adjacent the window 38 for measuring the remaining sorption capacity of the scrubber 30. For example, during routine maintenance of a machine on which scrubber 30 is implemented, vehicle 20 for example, the window 38 can be checked to determine whether replacement of the scrubber 30 is necessary.

When replacement is needed, i.e. the sorbent is saturated and entirely changed colors, the scrubber 30 can simply be removed from the exhaust stream and replaced. In another form of the invention, once removed, the spent sorbent and/or the scrubber 30 can be reused. For example when the spent sorbent is converted to $MnSO_4$, this $MnSO_4$ can be used as a starting material to reform the Mn—OMS material on the support. This reforming can be accomplished by removing the spent sorbent and its support (such as a monolith) from the housing 32. After processing and appropriate calcination the spent sorbent is returned to its OMS structure and is ready to absorb additional $SO_x$.

Alternatively, the necessary reagents for reforming the spent sorbent, for example KOH and $O_2$, can be circulated through the housing 32 without removing the spent sorbent. The inlet and outlet ports 34 and 36 can be used as the reagent inlet and outlet ports to recharge the sorbent in this fashion when the scrubber 30 is removed from the exhaust stream. However, as illustrated, scrubber 30 includes optional dedicated inlet and outlet ports 44 and 42 for this purpose. Ports 42, 44 permit recharging without removal from the exhaust, or they may be used in conjunction with offline recharging via inlet and outlet 34, 36.

Reference will now be made to examples illustrating specific features of inventive embodiments. It is to be understood, however, that these examples are provided for illustration and that no limitation to the scope of the invention is intended thereby. Further, certain observations, hypotheses, and theories of operation are presented in light of these examples in order to further understanding, but these are likewise not intended to limit the scope of the invention.

EXAMPLES

Example 1

Sample Preparations and Test Conditions OMS 2×2

2×2 manganese based octahedral molecular sieve (tunnel structure cryptomelane) was prepared using the methods developed by DeGuzman, et al. (3) A typical synthesis was carried out as follows: 11.78 g $KMnO_4$ in 200 ml of water was added to a solution of 23.2 g $MnSO_4.4H_2O$ in 60 ml of water and 6 ml of concentrated $HNO_3$. The solution was refluxed at 100° C. for 24 h, and the product was washed and dried at 120° C. Hydrothermal reaction in Teflon bottles at 90° C., instead of the reflux method, was also used for the synthesis.

An alternative synthesis method for cryptomelane was purging $O_2$ through mixture of $MnSO_4$ and KOH solution, followed by calcination at 600° C. (3) A typical preparation was: a solution of 15.7 g KOH in cold 100 ml of water was added to a solution of 14.9 g of $MnSO_4.H_2O$ in 100 ml of water. Oxygen gas was bubbled (about 10 L/min) through the solution for 4 hours. The product was washed with water and calcined in air for 20 h.

The dried materials were sieved to provide 40–80 mesh particles for the $SO_2$ absorption tests, which was carried out in a temperature controlled reactor with a Sulfur Chemiluminescent Detector (SCD) analysis system. Unless otherwise stated, the absorption testing conditions were 0.5 gram 40–80 mesh absorbent particles, 100 standard cubic centimeters per minute (sccm) exhaust air flow with 250 parts per million (ppm) $SO_2$, 75% $N_2$, 12% $O_2$, and 13% $CO_2$.

The $SO_2$ absorption performance of cryptomelane material synthesized by refluxing mixture of $KMnO_4$ and $MnSO_4$ solutions was also systemically tested under different temperature, gas hour space velocity (GHSV), $SO_2$ concentrations, and feed gas compositions, and the results are summarized in Table 1.

Before each $SO_2$ absorption measurement, the material was heated at 500° C. for 2 h in flowing air. To characterize the property changes before and after $SO_2$ absorption, powder X-ray diffraction pattern (XRD), particle surface area (SA), and scanning electron microscopy (SEM) images were collected on some of the tested materials.

Example 2 (Comparative)

Comparative Breakthrough Absorption Capacities

For purposes of comparison, $SO_2$ absorption capability of several commercially available materials were tested at a temperature range from 250° C. to 475° C. under the testing conditions indicated above (0.5 gram 40–80 mesh absorbent particles, 100 sccm exhaust air flow with 250 ppm $SO_2$, 75% $N_2$, 12% $O_2$, and 13% $CO_2$). These materials included $La_2O_3$ or BaO doped $ZrO_2$—$CeO_2$ mixtures (from Daiichi Kigenso Kagaku Kogyo Co., Ltd.), $ZrO_2$ (from RC100, Inc.), $Al_2O_3$ (from Engelhard, acidic), CaO (from Alfa Aesar Inc), and $MnO_2$ (from Erachem Comilog, Inc.) which were obtained from their respective commercial sources.

Table 2 presents a summary of the $SO_2$ absorption capacities for certain of these $SO_2$ adsorbents. The $SO_2$ capacity was calculated based on weight of $SO_2$ adsorbed per gram of adsorbent when 1% of the initial $SO_2$ concentration was observed eluting from the absorbent bed. This is defined as the breakthrough absorption capacity. As seen in Table 2, the $SO_2$ breakthrough absorption capacities for these materials are generally less than 5 wt %. Of the other materials tested, the absorption capacities for the $MnO_2$ was selected for more direct comparison to the materials of Example 1 and are presented in the Examples below.

TABLE 1

$SO_2$ absorption test conditions for cryptomelane material

| Variable conditions | Other conditions |
|---|---|
| $SO_2$ absorption temperature<br>250° C., 325° C.,<br>and 475° C. | 0.5 g 40–80 mesh absorbent, feed gas: 250 ppm $SO_2$, 82% $N_2$, 18% $O_2$, ~8,000 $hr^{-1}$ GHSV |
| Gas Hour Space Velocity, GHSV, $hr^{-1}$<br>8000,<br>30000,<br>and 60000 | 0.5 g 40–80 mesh absorbent for 8K and 30K $hr^{-1}$ GHSV test, and 0.25 g for 60K test,<br>325° C., feed gas: 250 ppm $SO_2$, 82% $N_2$, 18% $O_2$. |
| $SO_2$ Concentration in feed gas<br>50 ppm<br>and 250 ppm | 0.5 g 40–80 mesh absorbent for 250 ppm $SO_2$ test, and 0.25 g for 50 ppm test<br>325° C., feed gas: 82% $N_2$, 18% $O_2$, ~30000 $hr^{-1}$ GHSV, |
| Feed gas composition | |
| Air<br>(250 ppm $SO_2$, 82% $N_2$ and 18% $O_2$)<br>$CO_2$ effect<br>(250 ppm $SO_2$, 75% $N_2$, 12% $O_2$, and 13% $CO_2$)<br>NO effect<br>(178 ppm $SO_2$, 178 ppm NO, 9% $N_2$, 20% $O_2$, 71% He)<br>CO effect<br>(250 ppm SO2, 250 ppm CO, 87% $N_2$, 13% $O_2$)<br>CO—NO—$H_2O$ effect<br>(125 ppm $SO_2$, 125 ppm CO, 125 ppm NO, 11% $H_2O$*, 19% $N_2$, 20% $O_2$, 50% He)<br>$O_2$-free effect<br>(250 ppm $SO_2$, 12.5% $N_2$, and 87.5% He) | For CO—NO—$H_2O$ test<br>0.25 g 40–80 mesh adsorbent, 325° C., 17K $hr^{-1}$ GHSV<br>For others<br>0.5 g 40–80 mesh adsorbent, 325° C., ~8K $hr^{-1}$ GHSV |

*Steam was introduced by purging $O_2$ through flask containing temperature-controlled de-ionized water. After passing through the absorbent, steam was removed before SCD detector using MD Gas Dryer (from Perma Pure Inc.) which can selectively separate $H_2O$ from gases mixture.

TABLE 2

SO$_2$ breakthrough absorption capacity of conventional SO$_2$ adsorbents

| Materials tested | 200° C. | 325° C. | 400° C. | 475° C. |
|---|---|---|---|---|
| 73.8% ZrO$_2$ –26.2% CeO$_2$ mixed oxide SA 53.5 m$^2$/g, 10000 hr$^{-1}$GHSV | | 2.2 wt % | 2.2 wt % | 2.2 wt % |
| 73.2% ZrO$_2$, 1.75% La$_2$O$_3$, 5.22% Nd$_2$O$_3$, and 19.9% CeO$_2$ mixed oxide SA 60.3 m$^2$/g, 7236 hr$^{-1}$GHSV | | 2.4 wt % | 3.1 wt % | 3.6 wt % |
| 61.8% ZrO$_2$, 29.4% CeO$_2$, and 8.9% La$_2$O$_3$ mixed oxide SA 69.1 m$^2$/g, 11400 hr$^{-1}$GHSV | 2.0 wt % | 3.5 wt % | 5.0 wt % | 5.3 wt % |
| 70.3% ZrO$_2$, 4.0% BaO, and 25.8% CeO$_2$ mixed oxide SA 29.2 m$^2$/g, ~10000 hr$^{-1}$GHSV | | 1.7 wt % | 1.7 wt % | 2.5 wt % |
| ZrO$_2$, SA 95.7 m$^2$/g, 10000 hr$^{-1}$GHSV | | | | 2.2 wt % |
| Al$_2$O$_3$, Engelhard Corp. SA 150 m$^2$/g, Acidic 7,281 hr$^{-1}$ GHSV | | 1.0 wt % | | |
| CaO, SA 2.7 m$^2$/g, ~10,000 hr$^{-1}$GHSV | | <0.2 wt % | <0.2 wt % | <0.2 wt % |

1. Other test conditions: 0.5 g 40–80 mesh absorbent, feed gas: 250 ppm SO$_2$, 75% N$_2$, 12% O$_2$, and 13% CO$_2$
2. SO$_2$ capacity based on gram of SO$_2$ adsorbed per gram of catalyst at 1% SO$_2$ breakthrough point Example 3

Breakthrough Absorption Capacities

Table 3 gives the SO$_2$ breakthrough and total absorption capacities of the materials synthesized according to Example 1, K$_x$Mn$_8$O$_{16}$ A (reflux synthesis, with projected final average Mn oxidation state 3.5$^+$), K$_x$Mn$_8$O$_{16}$ B (reflux synthesis, with projected final average Mn oxidation state 4$^+$), Cu-doped K$_x$Mn$_8$O$_{16}$ B (hydrothermal synthesis, with projected final average Mn oxidation state 4$^+$), and K$_x$Mn$_8$O$_{16}$ C (synthesized from MnSO$_4$ and KOH). The projected final Mn oxidation state (PAOS) is calculated based on the relative amount of KMnO$_4$ and MnSO$_4$ in the starting solution, i.e. PAOS=(moles of KMnO$_4$*7+moles of MnSO$_4$*2)/(moles of KMnO$_4$+moles of MnSO$_4$). Breakthrough capacities were measured at 1% breakthrough as described in Example 2, and total SO$_2$ absorption capacity was also measured with the values given in parentheses in Table 3. For example, the breakthrough and maximum SO$_2$ absorption capacities for K$_x$Mn$_8$O$_{16}$ B are 58 wt % and 68 wt % respectively. Under similar reaction conditions, these materials have significantly higher breakthrough SO$_2$ absorption capacity than the conventional SO$_2$ adsorbents given in Table 2. To facilitate comparison, the results for the commercially obtained electrolytic MnO$_2$ (EMD, Erachem Comilog, Inc.) discussed above are presented in Table 3.

TABLE 3

SO$_2$ absorption capacity of cryptomelane materials synthesized

| Materials tested | SA, m$^2$/g | SO$_2$ breakthrough capacity (total capacity) |
|---|---|---|
| K$_x$Mn$_8$O$_{16}$ A, 14000 hr$^{-1}$ GHSV | 51 | 28 (45)$^b$ wt % |
| Cu-doped K$_x$Mn$_8$O$_{16}$ B$^{a)}$ 9637 hr$^{-1}$ GHSV | 88 | 57.5 (67) wt % |
| K$_x$Mn$_8$O$_{16}$ B, ~7500 hr$^{-1}$ GHSV | 74 | 58 (68) wt % |
| K$_x$Mn$_8$O$_{16}$ C, ~8000 hr$^{-1}$ GHSV | 32 | 48 (xx) wt % |
| EMD MnO$_2$, 12000 hr$^{-1}$ GHSV | 30 | 3.5 (9) wt % |

*Other test conditions: 0.5 g 40–80 mesh absorbent, 325° C., feed gas: 250 ppm SO$_2$, 82% N$_2$, and 18% O$_2$ for K$_x$Mn$_8$O$_{16}$ C, for others: 75% N$_2$, 12% O$_2$, and 13% CO$_2$
$^a$CuSO$_4$ was added in MnSO$_4$ solution.
$^b$Data in parentheses are maximum SO$_2$ absorption capacities.

Example 4

SO$_2$ Absorption at 325° C.

FIG. 1 is a plots showing SO$_2$ absorption on K$_x$Mn$_8$O$_{16}$ A, B, Cu-doped K$_x$Mn$_8$O$_{16}$ B, and EMD MnO$_2$, as a function of the weight percentage of SO$_2$ fed at 325° C. The left axis is the percentage of SO$_2$ not absorbed (i.e. that passed through the bed) and corresponds to the S-shaped curves. The right axis is the wt % SO$_2$ absorbed and corresponds to the curves whose slope is initially 1 at low feed amounts and then tends towards slope of zero at high feed amounts. All weight percentages are relative weight of absorbent.

Example 5

Changes After Absorption

Figure 2A:
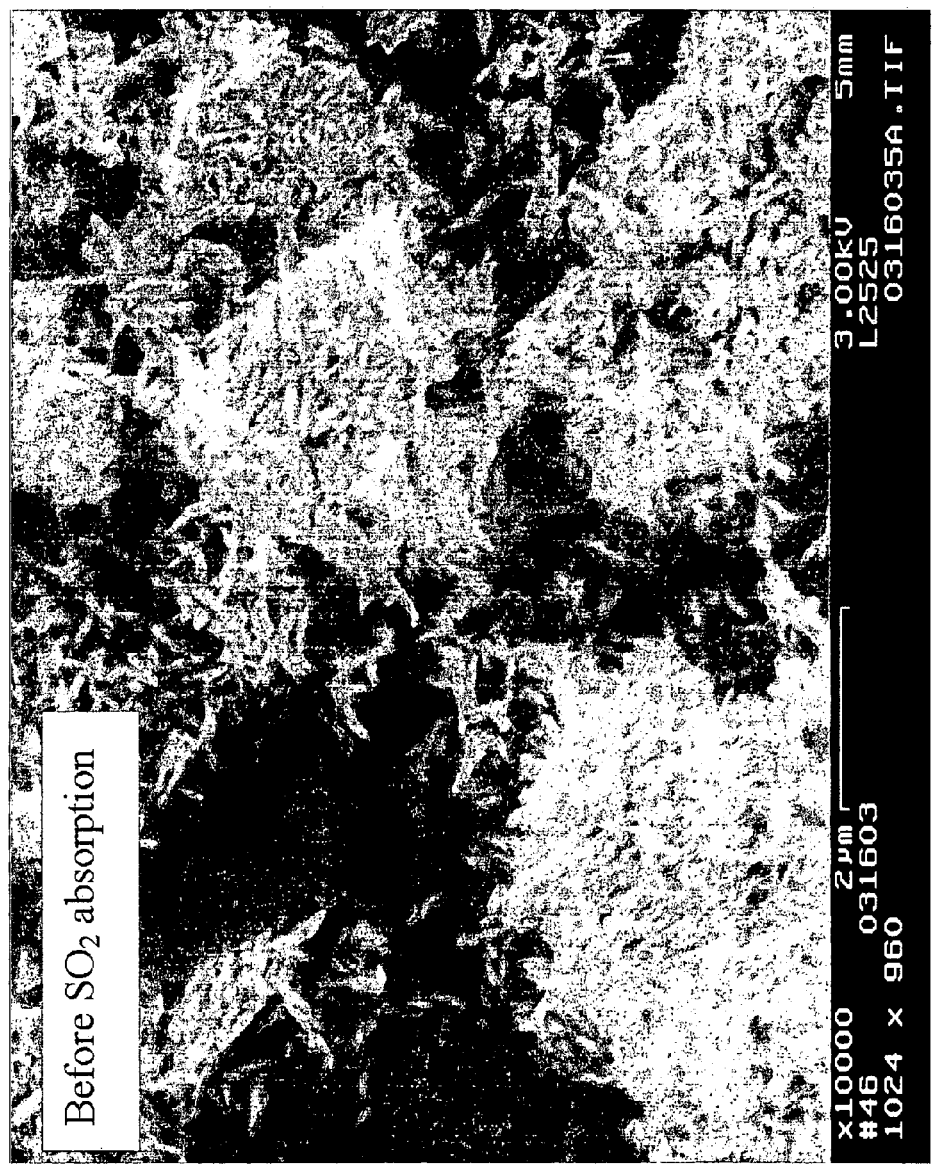
FIGS. 2a and 2b are exemplary scanning electron microscopy images of a 2×2 Mn—OMS material before and after $SO_2$ absorption, respectively.
Figure 2B:
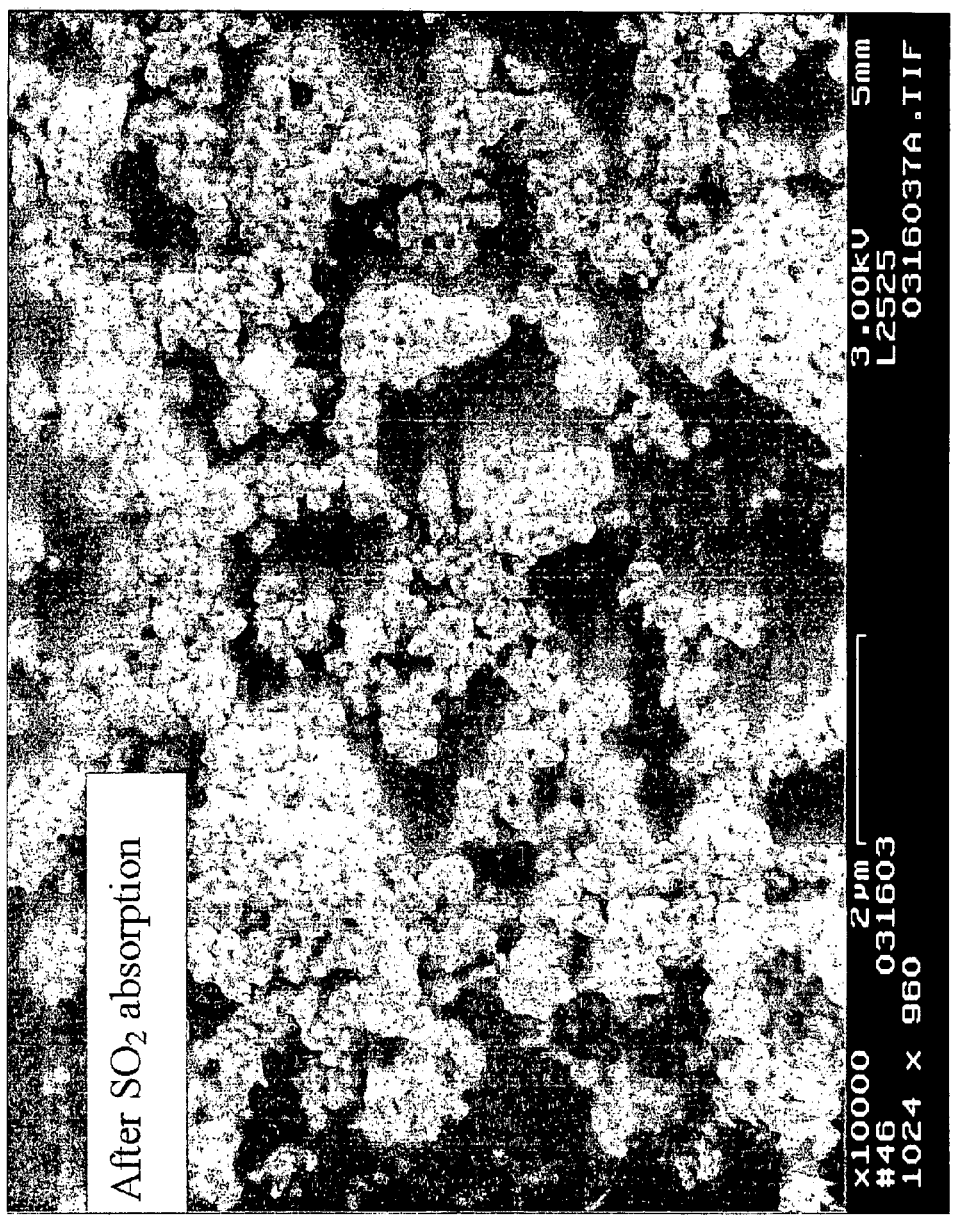
Figure 3A:
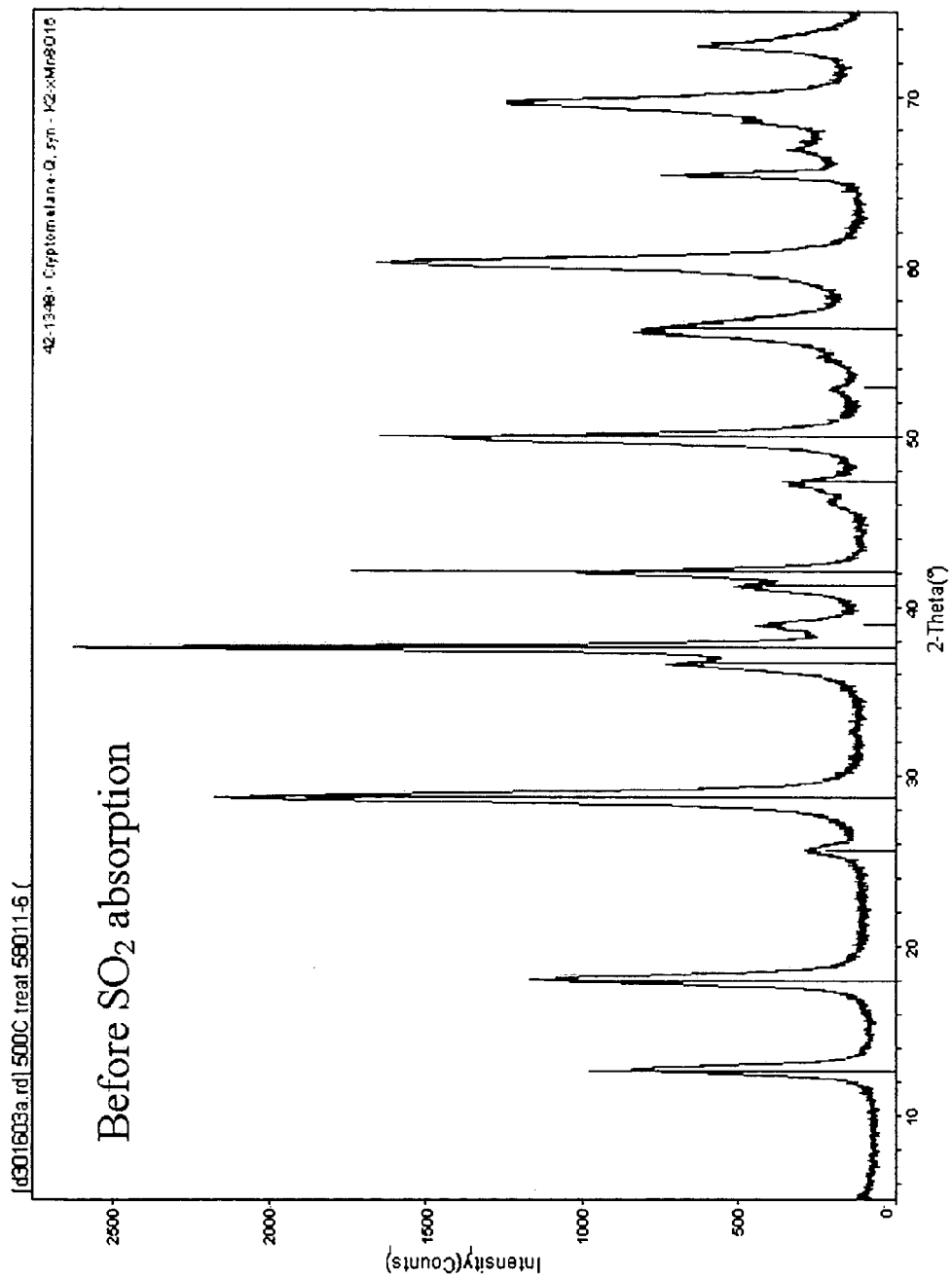
FIGS. 3a and 3b are exemplary x-ray diffraction patterns of a 2×2 Mn—OMS material before and after $SO_2$ adsorption, respectively.
Figure 3B:
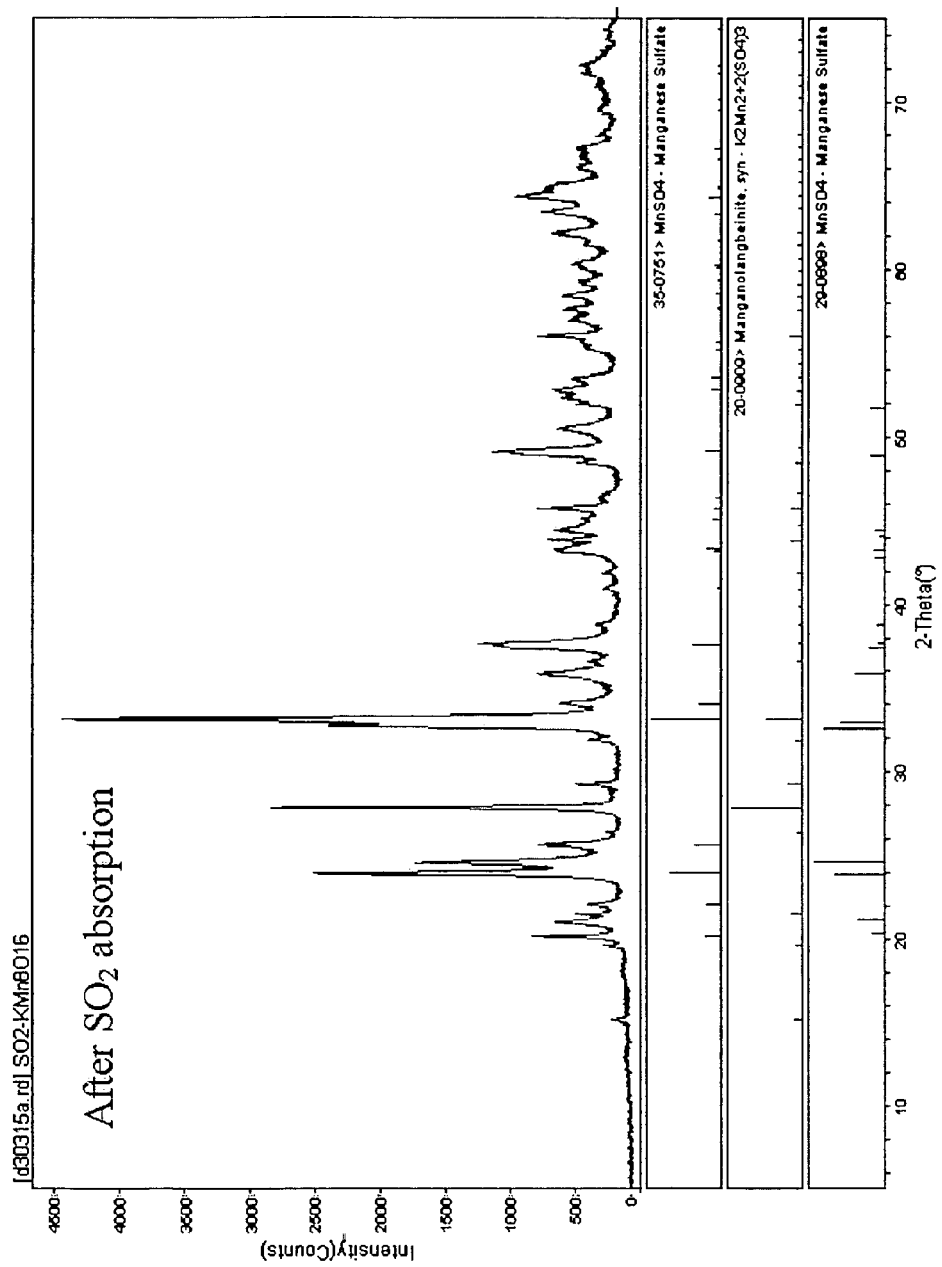
Figure 4:
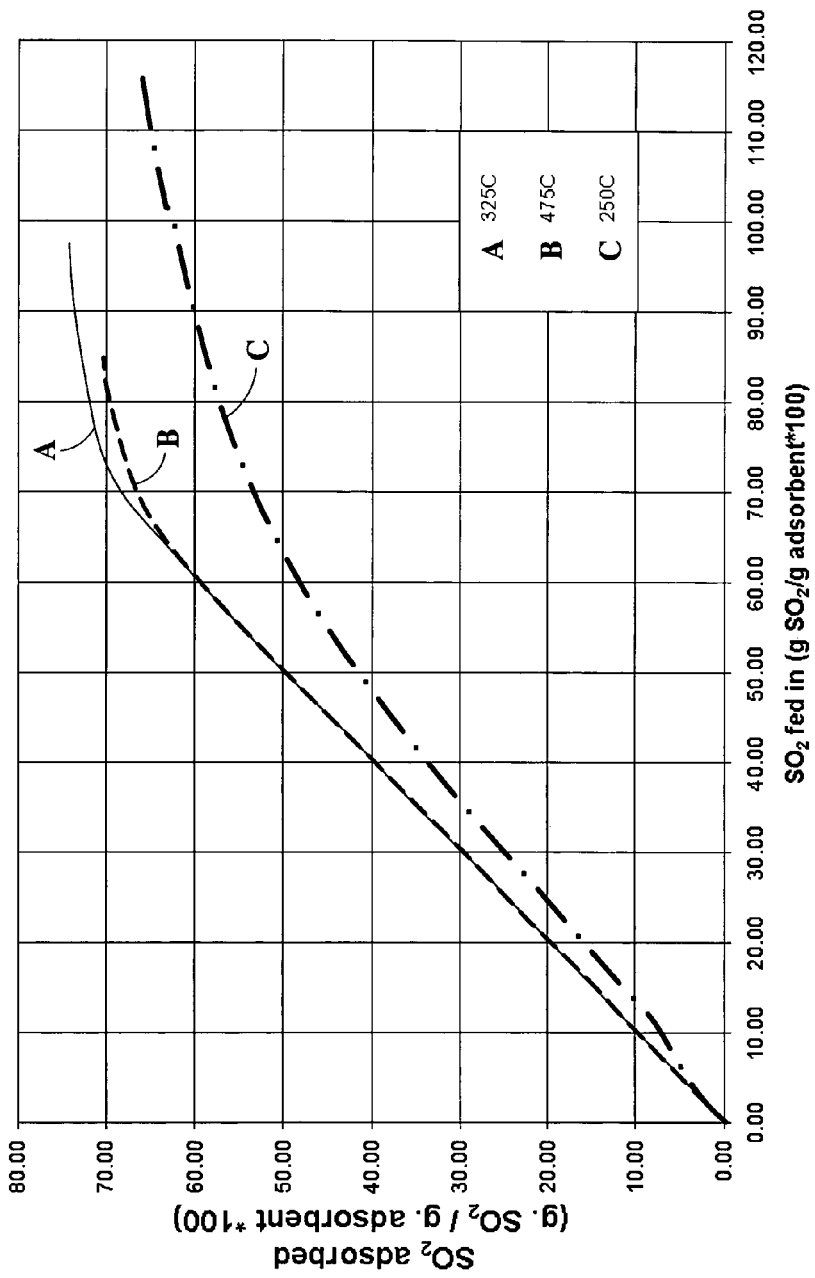
FIG. 4 is exemplary plots of absorption of $SO_2$ on an Mn—OMS material at different gas feed temperatures.

FIGS. 2 and 3 are before and after Scanning Electron Microscopy (SEM) Images and x-ray diffraction patterns (XRD), respectively, for the SO$_2$ absorption by K$_x$Mn$_8$O$_{16}$ B at 325° C. As shown in FIG. 2, the morphology and the crystal structure of the K$_x$Mn$_8$O$_{16}$ material significantly changes after SO2 absorption. The surface area of this material also decreased sharply from 74 m$^2$/g to 4.6 m$^2$/g, and the XRD patterns indicate that the OMS structure had converted to a mixture of MnSO$_4$ and manganolangbeinite K$_2$Mn$_2$(SO$_4$)$_3$. A visible color change in the absorbent was also evident. It was initially black and changed to yellow after the SO$_2$ absorption.

Example 6

Temperature Dependence

Figure 5:
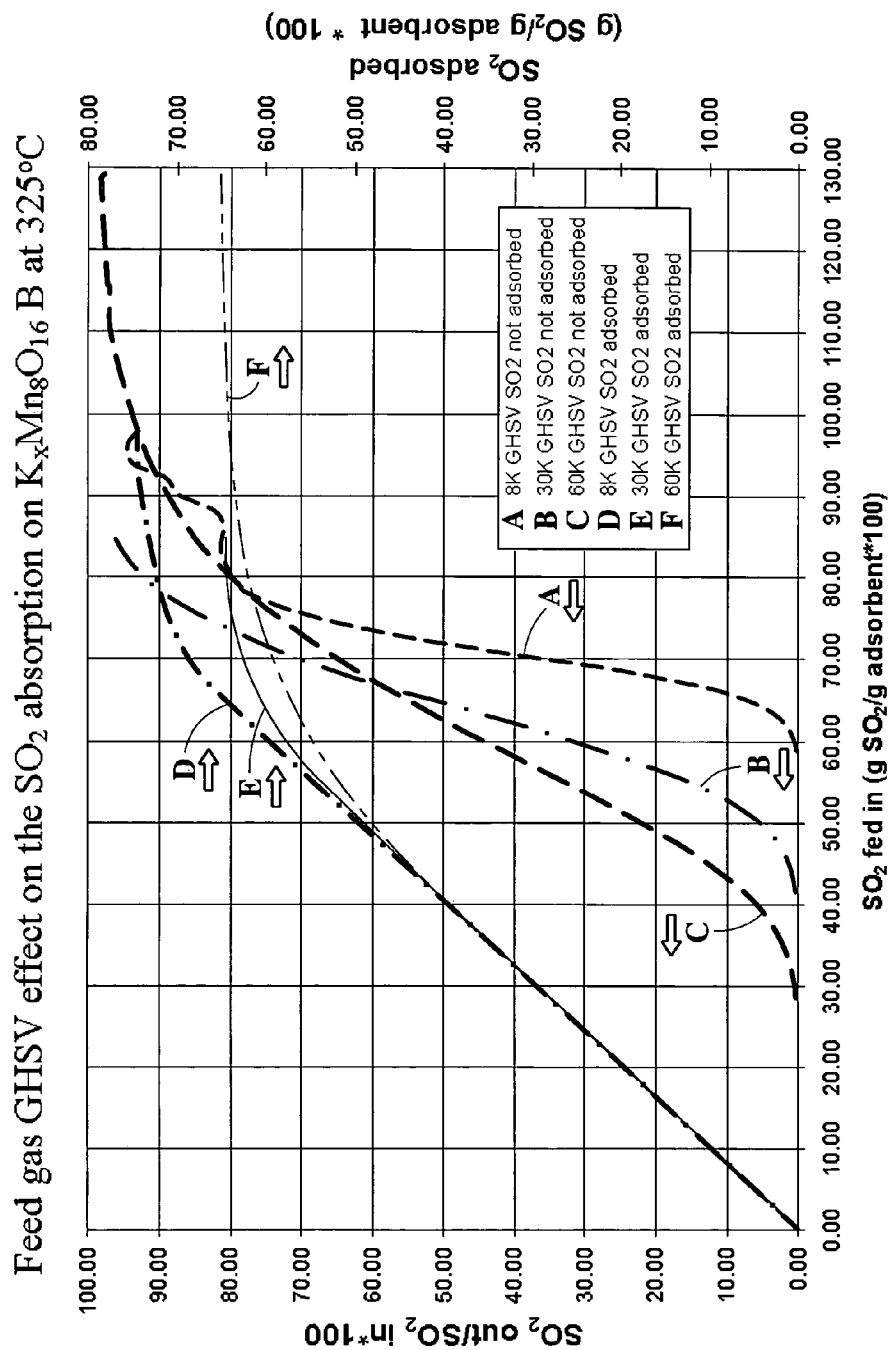
FIG. 5 is exemplary plots of adsorption of $SO_2$ on an Mn—OMS material at different gas feed rates.

FIG. 5 is a plot of the wt % of SO$_2$ absorption on K$_x$Mn$_8$O$_{16}$ B at 250° C., 325° C. and 475° C. under the other test conditions as indicated in Table 1 (0.5 g 40–80 mesh absorbent, feed gas: 250 ppm SO$_2$, 82% N$_2$, 18% O$_2$,~8,000 hr$^{-1}$ GHSV). Even at as low a temperature as 250° C., this material could adsorb more than 66 wt % SO$_2$, although absorption is not 100% and some SO$_2$ breakthrough was observed even initially.

Example 7

Feed Gas Flow Rate Dependence

Figure 6:
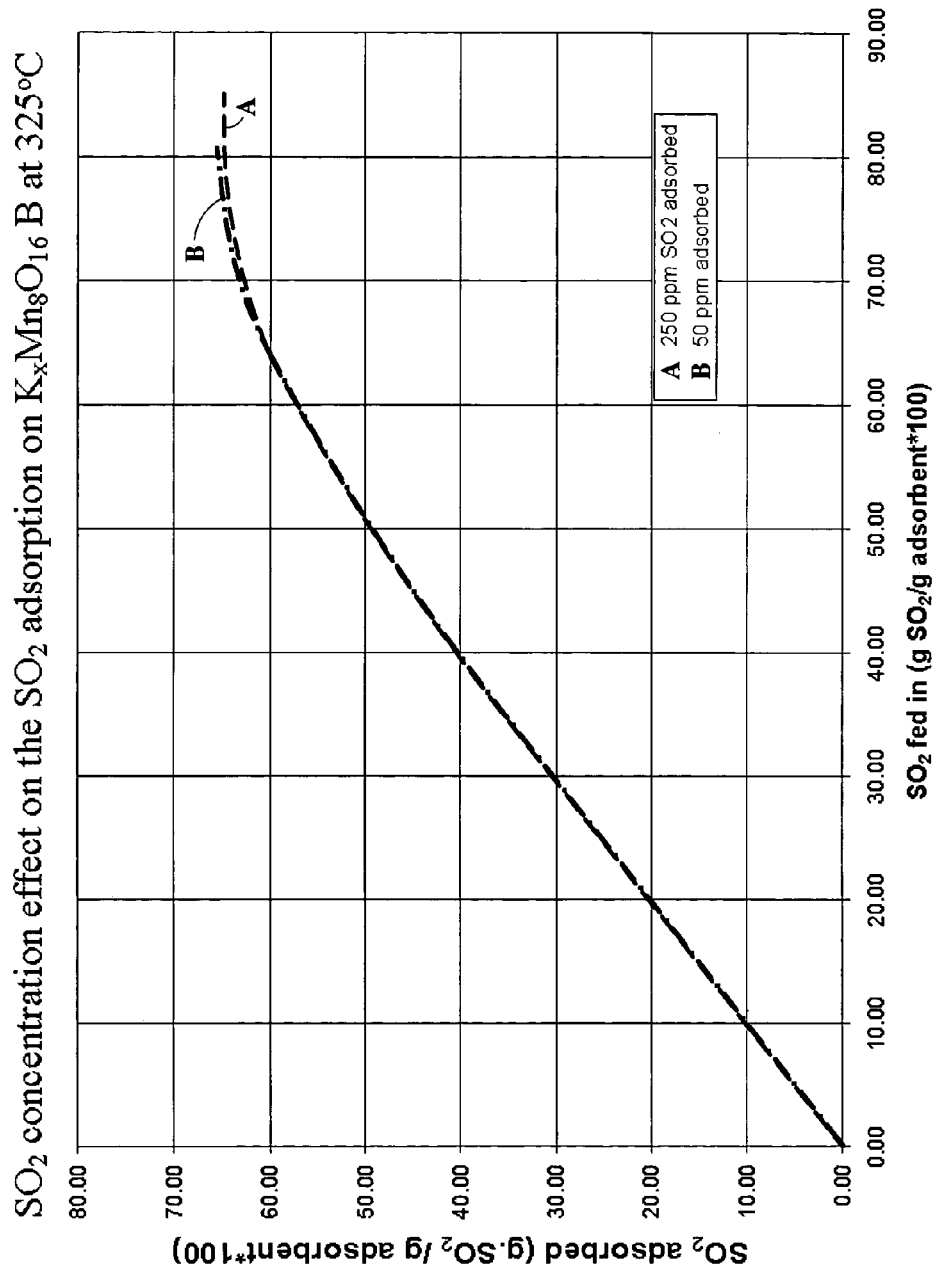
FIG. 6 is exemplary plots of adsorption of $SO_2$ on an Mn—OMS material at different concentrations of $SO_2$ in the feed gas.

FIG. 6 shows the feed gas GHSV effect on the $SO_2$ absorption on $K_xMn_8O_{16}$ B at 325° C. The breakthrough $SO_2$ capacity decreased from 61, to 44, and 33 wt % as the feed GHSV increased from 8K, to 30K and 60K hr$^{-1}$. As the feed GHSV increased, the total $SO_2$ absorption capacity decreased, but not significantly, from 74 to 64 and 63 wt %.

Example 8

Feed Gas Composition Dependence

Figure 7:
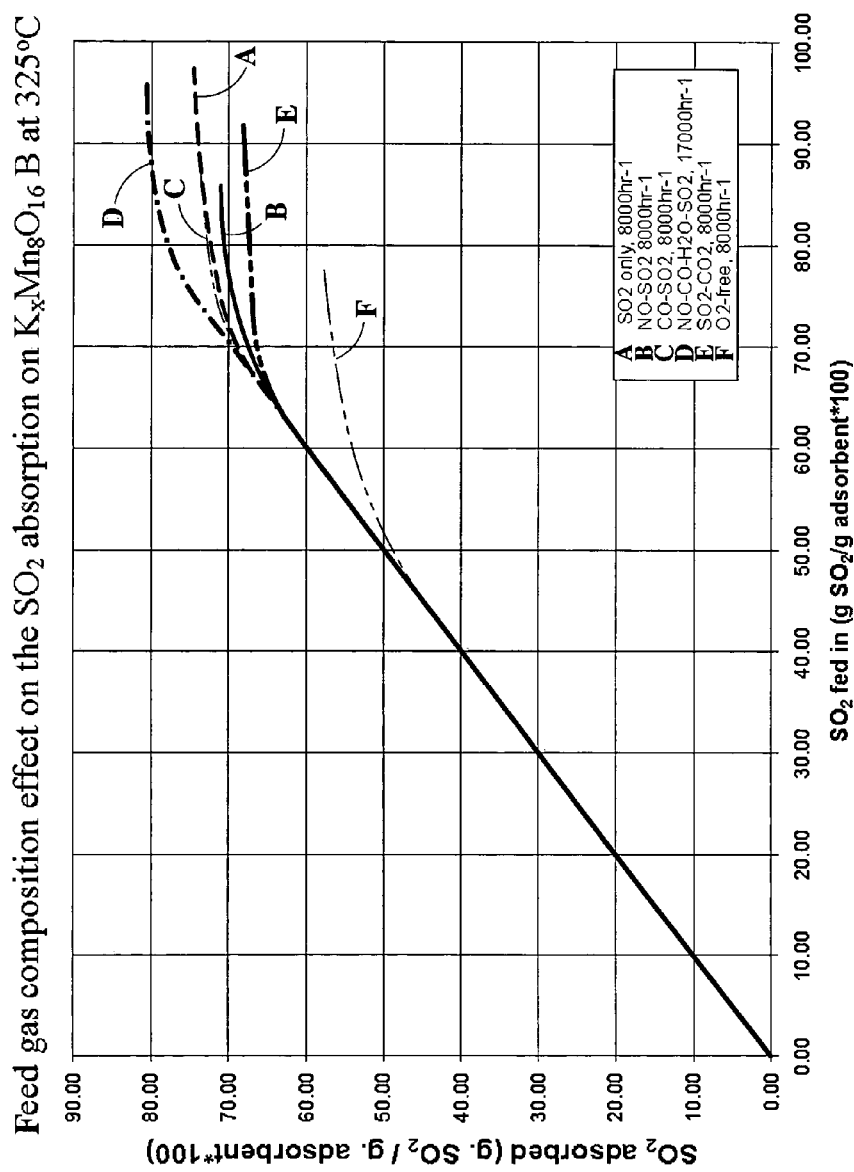
FIG. 7 is exemplary plots of absorption of $SO_2$ on an Mn—OMS material at different feed gas compositions.
Figure 8:
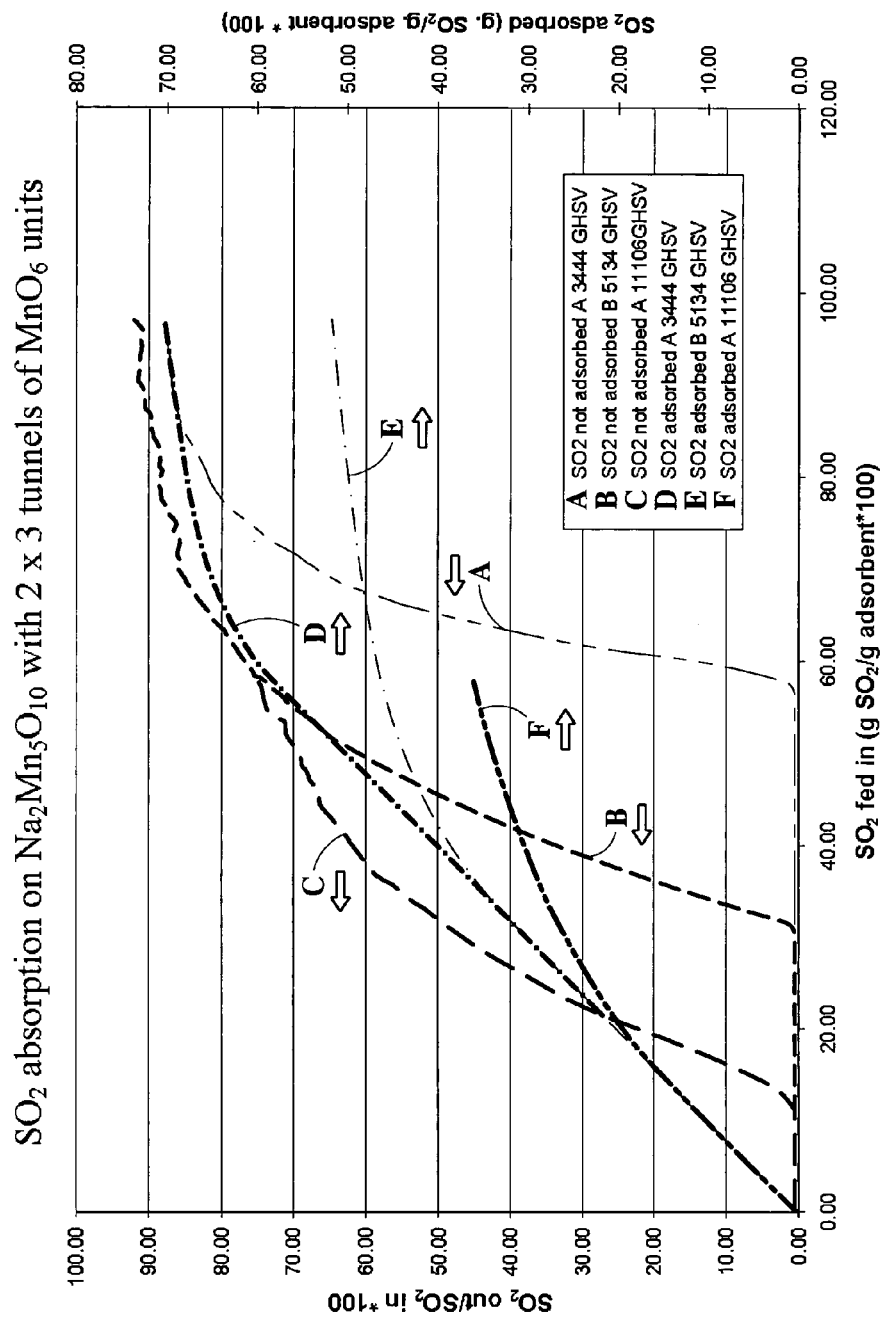
FIG. 8 is exemplary plots of absorption of $SO_2$ on 2×3 Mn—OMS materials at different gas feed rates.

FIG. 7 shows that increasing $SO_2$ concentration in the feed gas from 50 ppm to 250 ppm almost had no effect on the $SO_2$ adsorption on $K_xMn_8O_{16}$ B. FIG. 8 shows feed gas composition effect on the $SO_2$ absorption on $K_xMn_8O_{16}$ B at 325° C. CO and NO, which also exist in the combustion waste gases, did not have any effect on the $SO_2$ absorption on $K_xMn_8O_{16}$. $CO_2$, at ~13% level, could slightly, if any, decrease the $SO_2$ breakthrough capacity (from 61 wt % to 59 wt %) and the total $SO_2$ capacity (from 74 to 68 wt %).

Surprisingly, the OMS material $K_xMn_8O_{16}$ B shows a higher $SO_2$ breakthrough capacity of 74 wt % and total $SO_2$ capacity of ~80 wt % in $CO—NO—SO_2—H_2O$ mixture feed gas even through the GHSV was 17K hr$^{-1}$. When steam was introduced into the system, the SCD signals were not very stable which may generate some error of the measurement. In the absence of $O_2$, cryptomelane material $K_xMn_8O_{16}$ B still has $SO_2$ breakthrough capacity of 41 wt % and total $SO_2$ capacity of 58 wt %. After $SO_2$ absorption test, the weight gain of the adsorbent was measured though it was not possible to collect all the adsorbent particles. Table 4 gives the weight gain data of the feed gas composition effect tests. For comparison, the total $SO_2$ absorption calculated from $SO_2$ concentration change for each test was also listed.

TABLE 4

Adsorbent weight gain after $SO_2$ absorption test in different feed gas at 325° C.

| | Feed Gas | | | | |
|---|---|---|---|---|---|
| | Air | $CO_2$ effect | CO effect | NO effect | $O_2$-free effect | $CO—NO—H_2O$ effect |
| Weight Gain, % | 65.7 | 65.6 | 66.2 | 64 | 50 | 66.8 |
| Total $SO_2$ absorbed, % | 74.6 | 68.1 | 74.1 | 70.7 | 58 | 80.6 |

*See Table 1 for detailed test conditions

Discussion of Examples 1–8:

Based on reaction (1), the maximum $SO_2$ capacity is believed to be controlled by oxidation state of Mn in the adsorbent. For the OMS materials $K_xMn_8O_{16}$ B and Cu-doped $K_xMn_8O_{16}$ B, the average projected oxidation state of Mn is 4; there are very few $K^+$ cations present in the structure. If the small amount of $K^+$ is ignored, the maximum $SO_2$ capacity should be ~73.5 wt %. The measured maximum $SO_2$ capacities (see Tables 3 and 4) are ~70 wt % for these two materials, which is very close to 73.5 wt % and reflects the contribution of the $K_2O$ byproduct. This result supports the hypothesis that reaction (1) dominates $SO_2$ absorption. Direct evidence is also seen in the XRD patterns before and after the $SO_2$ absorption. After $SO_2$ absorption, the OMS structure completely changed to $MnSO_4$ and manganolangbeinite $K_2Mn_2(SO_4)_3$. The formation of $K_2Mn_2(SO_4)_3$ means more $SO_4^{2-}$ than $Mn^{2+}$ is formed and that reaction (1) needs to be modified slightly. A postulate is that the cryptomelane material itself or the $SO_2$ adsorbed material (mostly $MnSO_4$) acts as a catalyst for the following reaction and formation of $K_2Mn_2(SO_4)_3$.

$$SO_2 + O_2 \rightarrow SO_3 \qquad (2)$$

Because the amount of $K^+$ is small, the whole $SO_2$ absorption process is mostly dominated by manganese oxidation. It should be noted that, while the presence of $O_2$ in the feed gas does help increase absorption, it is not necessary, as demonstrated by the satisfactory absorption performance in the oxygen-free feed gas test (feed gas composition: 250 ppm $SO_2$, 12.5% $N_2$, and 87.5% He). After $SO_2$ absorption in an $O_2$-free environment, both $MnSO_4$ and $K_2Mn_2(SO_4)_3$ were formed, suggesting that other reactions involving oxygen transfer and formation of some amorphous phases also happened in an $O_2$-free environment.

The synthesized $K_xMn_8O_{16}$ A had an average projected Mn oxidation state of +3.5. The ideal formula for this material should be $K_4Mn_8O_{16}$ (after water removal at 500° C. and assuming all the counter-cations are $K^+$). Then according to reaction (1), the maximum capacity is 45 wt %, which exactly matches the measurement (see Table 3). If reaction (2) also exists with this material, $K_2Mn_2(SO_4)_3$ should form, which was not seen in an XRD pattern (not shown), and the maximum $SO_2$ capacity should be 60 wt %. This suggests that reaction (1) predominates, and that reaction (2) occurs only to a very small extent or not at all. Based on the results from $K_xMn_8O_{16}$ A (hydrothermal synthesis, with projected final average Mn oxidation state 3.5), $K_xMn_8O_{16}$ B (reflux synthesis, with projected final average Mn oxidation state 4) and Cu-doped $K_xMn_8O_{16}$ B (hydrothermal synthesis, with projected final average Mn oxidation state 4), neither the choice between reflux or hydrothermal synthesis, nor doping with Cu significantly changes $SO_2$ break through absorption capacity or maximum absorption capacity. This suggests that there is no kinetic or thermodynamic effect attributable to doping or the synthesis mechanism.

The alternative synthesis method of purging $O_2$ through a mixture of $MnSO_4$ and KOH solution followed by calcination at 600° C. did show some effect. $K_xMn_8O_{16}$ C, synthesized using this method, gives ~50 wt % $SO_2$ breakthrough capacity and ~60 wt % $SO_2$ total capacity, which are lower than those for $K_xMn_8O_{16}$ B. Potential reasons for this disparity include 1) possible incomplete oxidation of $Mn^{2+}$ to $Mn^{4+}$, 2) the relative low surface area (32 m$^2$/g vs. 75 m$_2$/g) and high density (~1 g/cm$^3$ vs. 0.67 g/cm$^3$), and 3) the product is not pure OMS as a small amount of $K_2SO_4$ was found to exists (see FIG. 9 for its XRD pattern). While the synthesis conditions could still be optimized to improve adsorption performance, the absorption performance is adequate to be effective and consideration of other factors renders this a desirable approach. For example, this synthesis method can significantly decrease the overall cost of the absorbent production. After $SO_2$ absorption, almost pure $MnSO_4$ is formed, which, being one of the starting materials, can be recaptured and reused. Also the density of $K_xMn_8O_{16}$ C is ~50% higher than that of $K_xMn_8O_{16}$ B, which indicates more adsorbents can be loaded and higher $SO_2$ capacity in a given volume can be achieved.

Although electrolytic manganese dioxide (EMD) from Erachem Comilog, Inc. has $Mn^{4+}$ and a surface area of ~30 m²/g, the SO₂ capacity for this material does not approach that of the OMS materials. This indicates that the OMS structure is important for high $SO_2$ absorption.

$K_xMn_8O_{16}$ B was tested at a temperature 250° C., 325° C., and 475° C. At 250° C., a lower $SO_2$ absorption rate was observed but the maximum $SO_2$ capacity is almost the same as that measured at 325° C. and 475° C. In comparing the results at 325° C. and 475° C., minimal difference was observed except that at 475° C., after the breakthrough capacity was reached, the SCD detector background slightly increased, indicating that some $SO_3$ was being released even though total absorption amount was still increasing.

Substantial variation in the feed gas flow rate affected the $SO_2$ absorption performance of $K_xMn_8O_{16}$ B adsorbent, though in practice this affect can be mitigated with appropriate sizing and design of the $SO_x$ trap. For example, the $SO_2$ breakthrough capacity decreased about 50% when the feed GHSV increased from 8K to 60K hr⁻¹. This indicates the $SO_2$ absorption reaction is mostly controlled by $SO_2$ mass diffusion through the adsorbent. Since the $SO_2$ concentration in the feed gas had little or no effect on its absorption suggests that reaction (1) is $0^{th}$ order for $SO_2$, and it is mostly controlled by the available active sites on the adsorbent.

Most components in the simulated exhaust combustion gases tested, CO, NO, $CO_2$, and $H_2O$, did not have a significant effect on the $SO_2$ absorption capacity of the $K_xMn_8O_{16}$ B adsorbent, and the absorption capacity in an oxygen free environment, while lower, was still acceptable. Therefore, it is expected that the Mn—OMS materials should be useful to remove $SO_2$ from gas streams in a wide variety of applications.

Example 9

Other OMS Structures $SO_2$ absorption capacities of other manganese oxides with tunnel structure, including Todorokite-type magnesium manganese oxide with channels of 3×3 $MnO_6$ units, sodium manganese oxide with channels of 2×4 $MnO_6$ units, sodium manganese oxide with channels of 2×3 $MnO_6$ units, and pyrolusite manganese oxide with 1×1 $MnO_6$ units, were studied.

Pyrolusite, $MnO_2$ 1×1, was obtained from Stream Chemicals. The as-received chemical was ball-milled for 1 hr to get ~1 μm particles before $SO_2$ absorption test. One todorokite material, OMS-1, was provided by Engelhard Corporation.

Other tunnel-structured manganese oxides were prepared in the lab using the methods described in the published literatures.

Birnessite was used as precursor for the synthesis of channel-structured manganese oxides. Birnessite-type layered manganese oxides were prepared using the methods used by Golden, et al. (5) and (6). A typical synthesis was carried out as: 250 ml 6.4 M NaOH solution was mixed with 200 ml 0.5M $MnSO_4$ at room temperature. Oxygen was immediately bubbled through a glass frit at a rate of 4 L/min. After 4.5 h the oxygenation was stopped and the precipitate was filtered out and washed with deionized water 4 times, and then dried in air at 100° C. About 13 g grey color birnessite product was obtained.

Two sodium manganese oxides with channels of 2×3 $MnO_6$ units (Na 2×3 A & B) were prepared by directly calcination of birnessite in air for 12 h at 500° C., and 650° C., respectively. (7).

Todorokite (magnesium manganese oxide with channels of 3×3 $MnO_6$ units) was prepared as described in (5) and (8): ~3 g birnessite was added in 100 ml 1M $MgCl_2$ solution, the mixture was shaken overnight at room temperature for $Mg^{2+}$ ion exchange for $Na^+$. The slurry was washed four times with deionized water. Then, $Mg^{2+}$-birnessite, together with 25 ml $H_2O$, was autoclaved at 150° C. for 48 hr. After washing with D.I water 3 times, the product was dried in air at 100° C. About 2.0 g todorokite-type tunnel structure manganese oxide (Mg 3×3) was obtained.

Sodium manganese oxide with channels of 2×4 $MnO_6$ units was prepared using method developed by Xia et al. (9). About 5 g birnessite, together with 25 ml 2.5M NaCl solution, was autoclaved at 210° C. for 48 hr. After washing with D.I water 3 times, the product was dried in air at 100° C. About 4.4 g black color product, Na 2×4, was obtained.

The dried materials were sieved to provide 40–80 mesh particles for the $SO_2$ absorption test, which was carried out in a temperature controlled reactor with an the SCD analytical system. All these materials were tested under the same conditions (0.5 gram 40–80 mesh absorbent particles, 100 sccm feed flow of 250 ppm $SO_2$ in 82% $N_2$, 18% $O_2$) at a temperature of 325° C. (See Table 5). Before each $SO_2$ absorption measurement, the absorbent material was heated at 500° C. for 2 h in flowing air to remove residual moisture. To characterize the structure change before and after $SO_2$ absorption, powder X-ray diffraction pattern (XRD) was collected on some of the tested materials.

TABLE 5

$SO_2$ absorption tests of other OMS materials

| Absorbent | Test Conditions* |
|---|---|
| $MnO_2$ 1 × 1 pyrolusite from Strem Chemicals, with 1 × 1 tunnels | 0.5 g 40–80 mesh absorbent, 325° C., 100 sccm flow of 250 ppm $SO_2$, 82% $N_2$, 18% $O_2$, GHSV = 18K hr⁻¹ |
| Na 2 × 3 A $Na_2Mn_5O_{10}$, with 2 × 3 tunnels, calcined at 500° C. for 12 h | 0.5 g 40–80 mesh absorbent, 325° C., 100 sccm flow of 250 ppm $SO_2$, 82% $N_2$, 18% $O_2$, GHSV = 3.4K hr⁻¹ |
| Na 2 × 3 B $Na_2Mn_5O_{10}$, with 2 × 3 tunnels, calcined at 650° C. for 12 h | 0.5 g 40–80 mesh absorbent, 325° C., 100 sccm flow of 250 ppm $SO_2$, 82% $N_2$, 18% $O_2$, GHSV = 5.1K hr⁻¹ |
| Na 2 × 3 A $Na_2Mn_5O_{10}$, with 2 × 3 tunnels, calcined at 500° C. for 12 h | 0.5 g 40–80 mesh absorbent, 325° C., 100 sccm flow of 250 ppm $SO_2$, 82% $N_2$, 18% $O_2$, GHSV = 11K hr⁻¹ |

TABLE 5-continued

SO$_2$ absorption tests of other OMS materials

| Absorbent | Test Conditions* |
|---|---|
| Na 2 × 4 sodium manganese oxide with 2 × 4 tunnels | 0.5 g 40–80 mesh absorbent, 325° C., 100 sccm flow of 250 ppm SO$_2$, 82% N$_2$, 18% O$_2$, GHSV = 11K hr$^{-1}$ |
| OMS-1 todorokite, with 3 × 3 tunnels, provided by Engelhard Corporation | 0.5 g 40–80 mesh absorbent, 325° C., 100 sccm flow of 250 ppm SO$_2$, 82% N$_2$, 18% O$_2$, GHSV = 11K hr$^{-1}$ |
| Mg 3 × 3 Todorokite, with 3 × 3 tunnels Synthesized | 0.5 g 40–80 mesh absorbent, 325° C., 100 sccm flow of 250 ppm SO$_2$, 82% N$_2$, 18% O$_2$, GHSV = 2.7 hr$^{-1}$ |

*Before each SO$_2$ absorption measurement, the absorbent material was heated at 500° C. for 2 h in 100 sccm air.

Example 10

Other OMS Structures Results and Comparison

The measured breakthrough capacities at selected gas flow rates for the materials prepared in Example 9 are given in Table 6 along with exemplary capacities for the 2×2 structure of Example 1.

TABLE 6

SO$_2$ absorption capacity of OMS absorbents

| Material tested | GHSV, hr$^{-1}$ | Break through capacity, wt % |
|---|---|---|
| MnO$_2$, from Strem Chemicals, 1 × 1 tunnels of MnO$_6$ units | 18K | <0.1 |
| Na$_2$Mn$_5$O$_{10}$, 2 × 3 tunnels of MnO$_6$ units, calcined at 500° C. for 12 h (A) | 3.4K | 57.5 |
| Na$_2$Mn$_5$O$_{10}$, 2 × 3 tunnels of MnO$_6$ units, calcined at 650° C. for 12 h (B) | 5.1K | 31 |
| Na$_2$Mn$_5$O$_{10}$, 2 × 3 tunnels of MnO$_6$ units, calcined at 500° C. for 12 h (A) | 11K | 12 |
| Sodium Manganese Oxide, 2 × 4 tunnels of MnO$_6$ units | 11K | 33 |
| MgMn$_2$O$_4$ from todorokite (3 × 3) provided by Engelhard Corporation | 11K | 1.5 |
| MgMn$_2$O$_4$ from the synthesized todorokite (3 × 3) | 2.7K | 53 |
| Cryptomelane, 2 × 2 tunnels of MnO$_6$ units | 8K | 62 |
| Cryptomelane, 2 × 2 tunnels of MnO$_6$ units | 30K | 42 |

Save two of the materials, the SO$_2$ breakthrough absorption capacities for these materials are generally much higher than those of conventional SO$_x$ absorbents (normally less than 5 wt %), establishing their usefulness as SO$_x$ absorbents pursuant to the present invention.

The 1×1 MnO$_2$ from Strem Chemicals was confirmed by XRD to be well crystallized pyrolusite, which consists of 1×1 MnO$_6$ tunnels. After calcination at 500° C. for 2 h in air, the structure remained stable. However the material exhibits poor absorption capacity, with a breakthrough capacity of about 0.1% and a maximum absorption capacity less than 3%.

The birnessite synthesized in this work was calcined in air either at 500° C. for 12 h (A), or at 650° C. for 12 h (B). In either case, sodium manganese oxide, Na$_2$Mn$_5$O$_{10}$, forms, the basic structure which consists of MnO$_6$ octahedra joined at edges to form a 2×3 tunnel structure. (7) FIG. 8 shows the SO$_2$ absorption performance of both the A and B formulations of this microporous manganese oxide under different GHSV. Similar to the 2×2 cryptomelane materials, this microporous manganese oxide also has very high SO$_2$ absorption capacity. At 3444 hr$^{-1}$ GHSV, the total SO$_2$ absorbed is ~70 wt %. At higher GHSV, the SO$_2$ absorption performance decreases, indicating the reaction is controlled by the mass diffusion of SO$_2$ through the absorbent. After SO$_2$ absorption, MnSO$_4$ forms.

Figure 9:
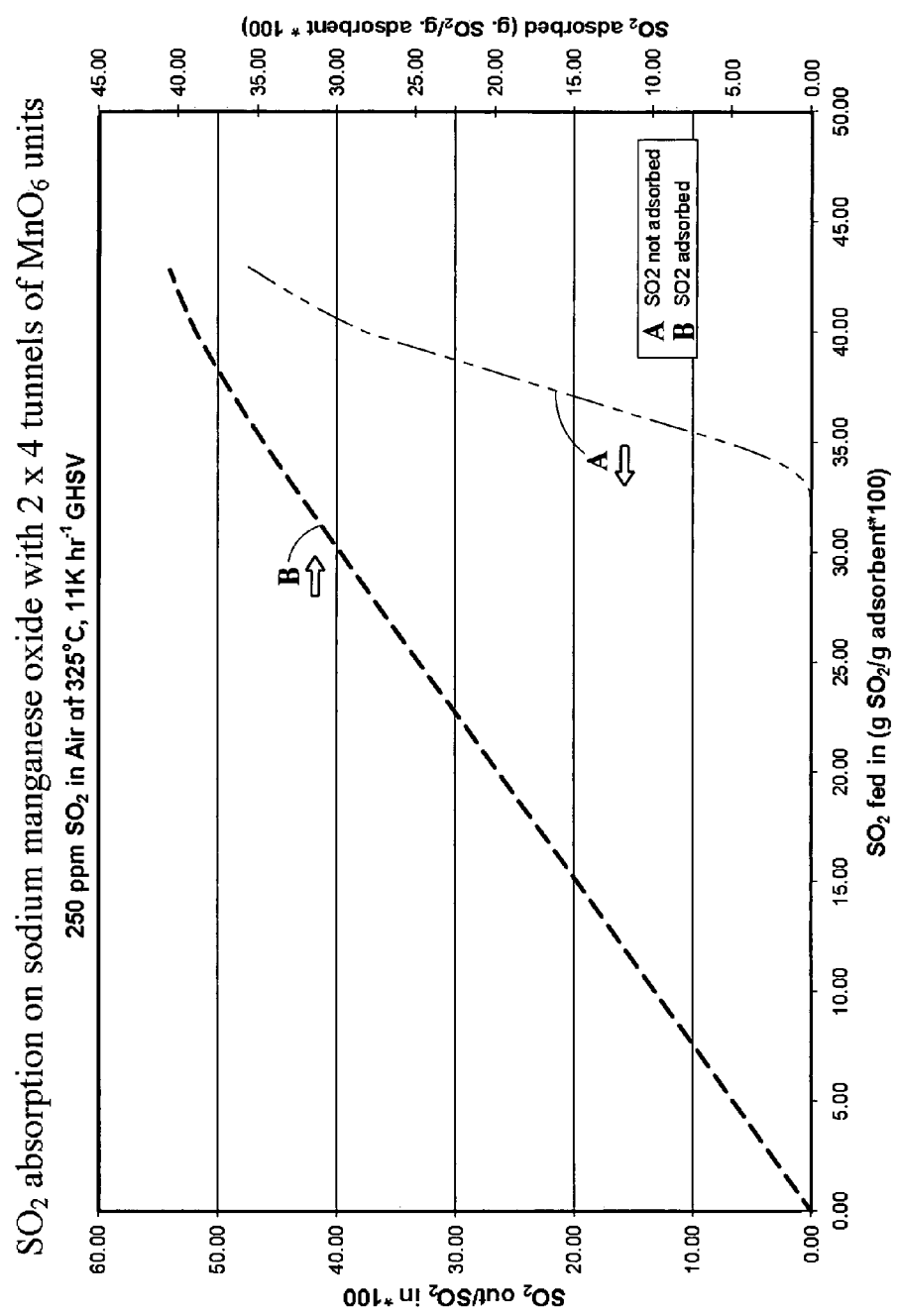
FIG. 9 is exemplary plots of absorption of $SO_2$ on a 2×4 Mn—OMS material.

The XRD pattern of the sodium manganese oxide synthesized by hydrothermal reaction in this work matched very well with the XRD pattern of the sodium manganese oxide material with 2×4 tunnel structure published by Xia et al. (10) Likewise, as expected, after calcination at 500° C. for 12 h in air, the 2×4 tunnel structure remains unchanged. FIG. 9 gives the SO$_2$ absorption test result at 10755 hr$^{-1}$ GHSV. This material also has high SO$_2$ absorption capacity.

While the todorokite magnesium manganese oxide prepared by hydrothermal reaction in this work was not well crystallized, the todorokite structure could still be identified in the XRD. However, after calcination at 500° C. for 2 h in air, the 3×3 tunnel structure changed mostly to MgMn$_2$O$_4$. This structure change was evident in the MgMn$_2$O$_4$ provided by Engelhard Corporation as well. While the todorokite materials both exhibited relative high absorption capacities, this instability at moderately high temperatures is a relative disadvantage for most applications. While the could be used as absorbents, most conventional implementations require stability above the absorbents at 500° C. or sometimes higher.

Closure

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with a fluid processing unit, it should be understood to comprehend singular or plural and one or more fluid channels as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein, including the following scientific publications referenced in the specification above:

(1) X. Chen, Y. F. Shen, S. L. Suib, and C. L. O'Young, "Characterization of Manganese Oxide Octahedral Molecular Sieve (M-OMS-2) Materials with Different Metal Cation Dopants", *Chem. Mater.* 2002, 14, 940–948.

(2) G. G. Xia, Y. G. Yin, W. S. Willis, J. Y. Wang, and S. L. Suib, "Efficient Stable Catalysts for Low Temperature Carbon Monoxide Oxidation", *J. Catal.* 1999, 185, 91–105.

(3) R. N. DeGuzman, Y. F. Shen, E. J. Neth, S. L. Suib, C. K. O'Young, S. Levine, and J. M. Newsam, "Synthesis and Characterization of Octahedral Molecular Sieves (OMS-2) Having the Hollandite Structure", *Chem. Mater.* 1994, 6 815–821.

(4) S. L. Suib, C-L O'Young, "Synthesis of Porous Materials", M. L. Occelli, H. Kessler, eds, M. Dekker, Inc., p. 215, 1997.

(5) D. C. Golden, C. C. Chen, and J. B. Dixon, "Synthesis of Todorokite", *Science*, 1986, 231, 717–719.

(6) D. C. Golden, C. C. Chen, and J. B. Dixon, "Transformation of birnessite to buserite, todorokite, and manganite under mild hydrothermal treatment", *Clays Clay Miner.* 1987, 35, 271–280.

(7) J. P. Parant, R. Olazcuaga, M. Devalette, C. Fouassier, and P. Hagenmuller, "Sur Quelques Nouvelles Phases de Formule $Na_xMnO_2$ ($x \leq 1$)", *J. Solid State Chem.* 1971, 3, 1–11.

(8) Y. F. Shen, R. P. Zerger, R. N. DeGuzman, S. L. Suib, L. McCurdy, D. I. Potter, and C. L. O'Young, "Manganese oxide octahedral molecular sieves: preparation, characterization, and applications", *Science*, 1993, 260, 511–515.

(9) G. G. Xia, W. Tong, E. N. Tolentino, N. G. Duan, S. L. Brock, J. Y. Wang, S. L. Suib, and T. Ressler, "Synthesis and characterization of nanofibrous sodium manganese oxide with a 2×4 tunnel structure", *Chem. Mater*, 2001, 13, 1585–1592.

What is claimed is:

1. A method for emissions control comprising:
at a location upstream from a particulate filter or NOx trap, removing a substantial quantity of a sulfur oxide from a combustion exhaust by contacting the exhaust with a quantity of a sorbent comprising a manganese-based octahedral molecular sieve (Mn—OMS).

2. The method of claim 1 wherein the Mn—OMS has the formula $X_aMn_8O_{16}$ wherein X is selected from the group consisting of alkali metals and alkaline earth metals and a is between 0.5 and 1.5.

3. The method of claim 2 wherein X is potassium.

4. The method of claim 1 wherein the contacting is at a temperature of at least about 100° C.

5. The method of claim 4 wherein the Mn—OMS has a sulfur dioxide absorption capacity of at least about 40% by weight at the contacting temperature.

6. The method of claim 1 wherein the exhaust is from a motor vehicle.

7. The method of claim 6 wherein the exhaust is a diesel engine exhaust.

8. The method of claim 1 wherein $MnSO_4$ is formed by the contacting, the method further comprising regenerating the sorbent after the contacting by reacting the $MnSO_4$ with KOH and $O_2$.

9. The method of claim 1 wherein the contacting removes at least about 90% of the sulfur oxide from the exhaust.

10. The method of claim 1 wherein the Mn—OMS is formed from $MO_6$ octahedra connected together such that the structure generates micropores in the form of channels of A×B octahedra, wherein A and B are integers from 2 to 4.

11. The method of claim 10 wherein more than 50% of the M elements by mole are manganese.

12. The method of claim 11 wherein a cation selected from $H^+$, $NH_4^+$, $Li^+$, $Na^+$, $Ag^+$, $K^+$, $Rb^+$, $Tl^+$, $Cs^+$, $Mg^{2+}$, $Ca^{2+}$, $Sr^{2+}$, $Ba^{2+}$, $Ra^{2+}$, $Cu^{2+}$, $Pb^{2+}$ is located is the channels.

13. The method of claim 12 wherein the cation is $K^+$.

14. The method of claim 10 wherein up to 5% of the M elements are dopant selected from copper, chromium, iron, nickel, cobalt, zinc, aluminum, gallium, titanium, tin, lead, antimony, indium, silicon, germanium, titanium and combinations thereof.

15. The method of claim 14 wherein at least 1% of the M elements are the dopant.

16. A system for emissions control comprising:
a source of a combustion exhaust stream; and
first and second emissions control devices receiving the exhaust stream;
wherein the first emission control device is upstream from the second emission control device;
wherein the first emission control device contains sorbent for removing a substantial quantity of sulfur dioxide from the exhaust stream;
wherein the sorbent comprises a manganese-based octahedral molecular sieve (Mn—OMS).

17. The system of claim 16 wherein the second emission control device is a particulate filter or NOx trap.

18. The system of claim 17 wherein the source of a combustion exhaust stream is the engine of a vehicle.

19. The system of claim 18 wherein the engine is a diesel engine.

20. The system of claim 19 wherein the sorbent has a sulfur dioxide absorption capacity greater than about 40% by weight at a temperature greater than 200° C.

21. The system of claim 16 wherein the sorbent has an Mn—OMS structure is a 2×2 structure.

22. The system of claim 16 wherein the first emission control device includes a quantity of the sorbent sufficient to remove at least about 90% of the sulfur dioxide in the exhaust stream over at least 24 hours of normal operation of the source of the combustion exhaust stream.

23. The system of claim 22 wherein the sorbent has a 2×2 structure.

24. A method for removing sulfur dioxide from a gas comprising:
removing at least about 95% of the sulfur dioxide in a gaseous stream by passing the gaseous stream through a sorbent bed, wherein the sorbent bed includes a manganese-based octahedral molecular sieve (Mn—OMS) on a support.

25. The method of claim 24 wherein the gaseous stream is less than 1 molar percent oxygen.

26. The method of claim 24 wherein the gaseous stream is substantially devoid of oxygen.

27. The method of claim 24 wherein the gaseous stream is a combustion exhaust.

28. A low emission motor vehicle comprising:
a combustion engine for powering the vehicle;
a first emission control device containing a sorbent and receiving an exhaust of the engine; and
a second emission control device downstream from the first emission control device for removing particulates and/or $NO_x$ from the exhaust which has passed through the first emission control device;
wherein the sorbent includes a quantity of a manganese-based octahedral molecular sieve (Mn—OMS) for substantially reducing the amount of $SO_2$ that would otherwise enter the second emission control device.

29. The motor vehicle of claim 28 wherein the engine is a diesel engine.

30. The motor vehicle of claim 28 wherein the first emission control device includes a housing having a window for determining the color of the sorbent.

31. The motor vehicle of claim 28 wherein the sorbent has a 2×2 structure.

32. A method comprising:
substantially reducing the levels of sulfur oxides in an exhaust gas by contacting the exhaust gas with a material selected from materials with structure type OMS 2×2, OMS 2×3 and OMS 3×3, formed from $MO_6$ octahedra connected together such that the structure generates micropores in the form of channels, said octahedra comprising at least one element (M) selected from elements from groups IIIB, IVB, VB, VIIB, VIIB, VIII, IB, IIB and IIIA of the periodic table and germanium wherein at least a major portion of element (M) is manganese, said material further comprising at least one element (B) selected from the group formed by the alkaline elements, the alkaline-earth elements, the rare earth elements, the transition metals and elements from groups IIIA, IVA of the periodic table.

33. The method of claim 32 wherein the average valence of the metals (M) is between about +3.5 and +4.

34. The method of claim 32 wherein at least a major portion of said element (B) is selected from potassium, sodium, strontium, copper, zinc, magnesium, rubidium and calcium and mixtures of at least two of said elements.

35. The method of claim 34 wherein at least 75% of the element M is manganese.

36. An emissions control device comprising:
a housing defining an inlet and an outlet;
wherein a quantity of a sulfur oxide sorbent is contained in the housing;
wherein the sorbent comprises a manganese-based octahedral molecular sieve (Mn—OMS);
wherein the housing includes a window for monitoring the color of the sorbent.

37. The device of claim 36 wherein the inlet is coupled to an exhaust stream from the internal combustion engine of a motor vehicle.

38. A method comprising:
removing sulfur oxides from the exhaust of an internal combustion engine with an emissions control device according to claim 36; and
removing the emissions control device from the exhaust based on color change of the sorbent.

* * * * *

UNITED STATES PATENT AND TRADEMARK OFFICE
CERTIFICATE OF CORRECTION

PATENT NO. : 7,153,345 B2  Page 1 of 1
APPLICATION NO. : 10/771866
DATED : December 26, 2006
INVENTOR(S) : Liyu Li and David L. King It is certified that error appears in the above-identified patent and that said Letters Patent is hereby corrected as shown below:

Column 1, line 58, "frequency" should read --frequently--.
Column 1, line 65, "aspect the present" should read --aspect of the present--.
Column 2, line 51, "$Si^{3+}$" should read --$Si^{4+}$--.
Column 8, line 9, "has becoming spent." should read --has become spent.--.
Column 9, Table1, "SO2" should read --$SO_2$--.
Column 12, line 29, "is a plots" should read --is a plot--.
Column 12, line 48, "SO2" should read --$SO_2$--.
Column 13, line 31, "absent" should read --absence--.
Column 14, line 54, "exists" should read --exist--.
Column 16, line 17, "by directly" should read --by direct--.
Column 16, line 39, "with an the SCD" should read --with an SCD--.
Column 18, line 40, "while the" should read --while they--.

Column 20, line 19, "is the" should read --in the--.
Column 21, line 30, "VIIB" should read --VIB--.
Column 21, line 31, "VIII" should read --VIIIB--.

Signed and Sealed this

Thirtieth Day of December, 2008

JON W. DUDAS
*Director of the United States Patent and Trademark Office*